(12) United States Patent
Ahn et al.

(10) Patent No.: US 11,937,217 B2
(45) Date of Patent: Mar. 19, 2024

(54) METHOD FOR RELAY TERMINAL TO TRANSMIT AND RECEIVE SIGNALS IN WIRELESS COMMUNICATION SYSTEM AND DEVICE FOR SAME

(71) Applicant: LG ELECTRONICS INC., Seoul (KR)

(72) Inventors: Joonkui Ahn, Seoul (KR); Seonwook Kim, Seoul (KR); Changhwan Park, Seoul (KR); Suckchel Yang, Seoul (KR)

(73) Assignee: LG ELECTRONICS INC., Seoul (KR)

(*) Notice: Subject to any disclaimer, the term of this patent is extended or adjusted under 35 U.S.C. 154(b) by 446 days.

(21) Appl. No.: 17/282,345

(22) PCT Filed: Oct. 25, 2019

(86) PCT No.: PCT/KR2019/014160
§ 371 (c)(1),
(2) Date: Apr. 1, 2021

(87) PCT Pub. No.: WO2020/091315
PCT Pub. Date: May 7, 2020

(65) Prior Publication Data
US 2021/0352643 A1 Nov. 11, 2021

(30) Foreign Application Priority Data

Oct. 31, 2018 (KR) .................. 10-2018-0132620

(51) Int. Cl.
*H04B 7/14* (2006.01)
*H04W 72/044* (2023.01)
*H04W 88/04* (2009.01)

(52) U.S. Cl.
CPC .......... *H04W 72/044* (2013.01); *H04W 88/04* (2013.01)

(58) Field of Classification Search
CPC .................................................. H04W 72/044
See application file for complete search history.

(56) References Cited

U.S. PATENT DOCUMENTS

| 10,873,888 B2* | 12/2020 | Seo ...................... H04W 84/04 |
| 2012/0327794 A1 | 12/2012 | Han et al. |
| 2013/0128803 A1* | 5/2013 | Takahashi ............ H04L 1/1812 370/315 |

FOREIGN PATENT DOCUMENTS

KR 101643228 7/2016

OTHER PUBLICATIONS

PCT International Application No. PCT/KR2019/014160, International Search Report dated Feb. 11, 2020, 5 pages.
(Continued)

*Primary Examiner* — Erika A Washington
(74) *Attorney, Agent, or Firm* — LEE, HONG, DEGERMAN, KANG & WAIMEY

(57) ABSTRACT

A method for a relay terminal to transmit and receive signals in a wireless communication system according to an embodiment of the present disclosure comprises: a step for transmitting, in a first time region, a UL signal to an upper node through a backhaul link and a DL signal to at least one lower node through an access link; and a step for receiving, in a second time region, a DL signal from the upper node through the backhaul link and a UL signal from the at least one lower node through the access link, wherein different frequency resources are allocated to the UL signal and the DL signal in the same carrier in each of the first time domain and the second time domain.

13 Claims, 26 Drawing Sheets

(56) References Cited

OTHER PUBLICATIONS

AT&T, "Enhancements to support NR backhaul links," 3GPP TSG RAN WG1 Meeting #94bis, R1-1810690, Oct. 2018, 15 pages.
Samsung, "Necessary Enhancements for NR IAB," 3GPP TSG RAN WG1 Meeting #94b, R1-1810864, Oct. 2018, 12 pages.
LG Electronics Inc, "Power control in IAB scenario," 3GPP TSG RAN WG1 Meeting #94bis, R1-1810276, Oct. 2018, 4 pages.

* cited by examiner

[FIG. 1]
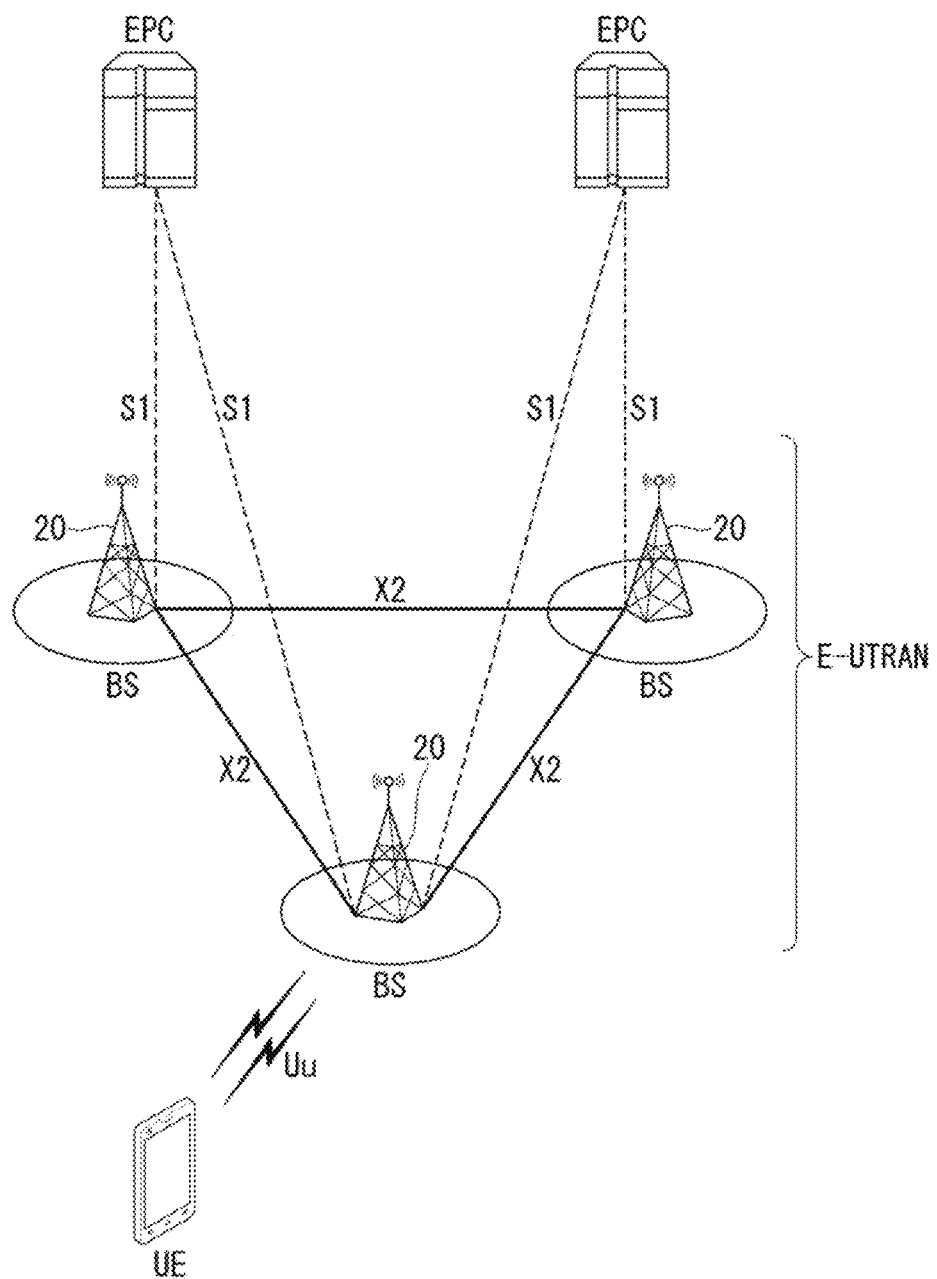

[FIG. 2]
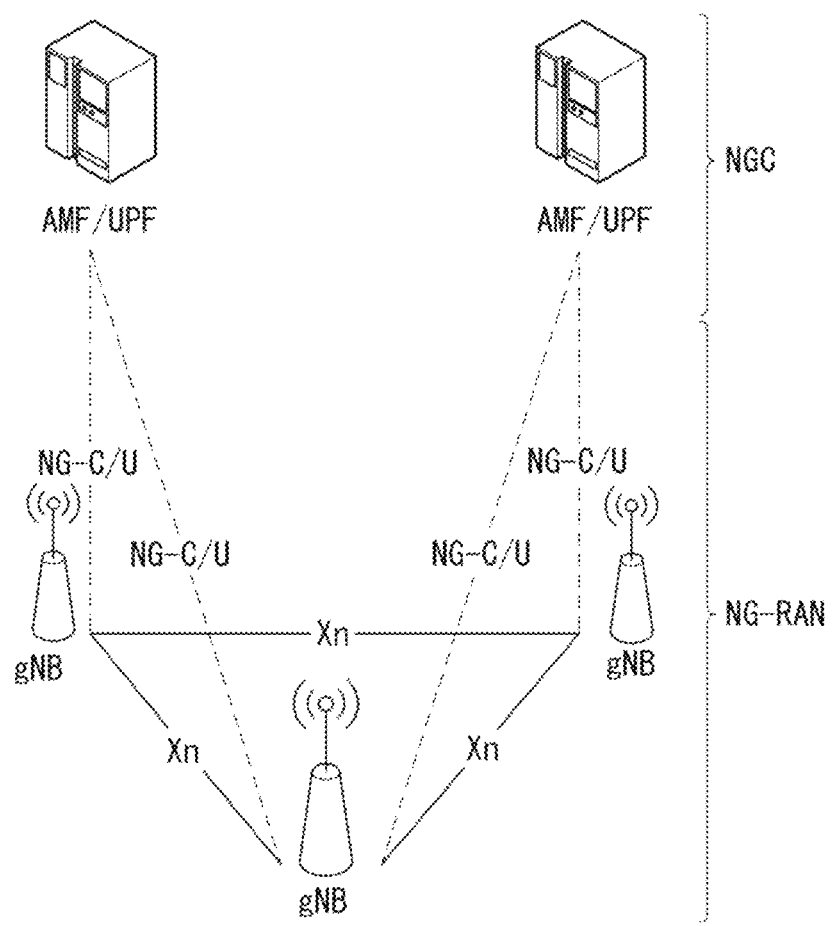

[FIG. 3]
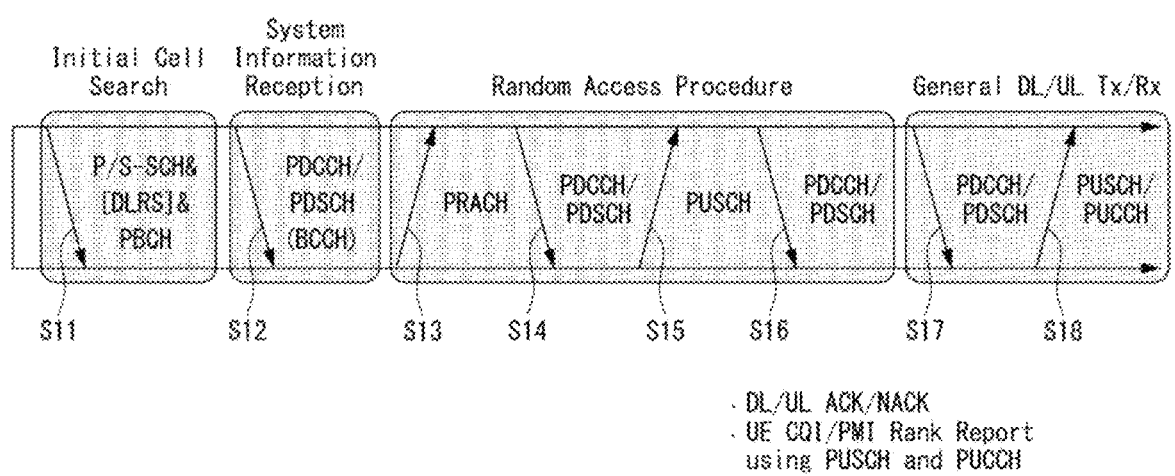

[FIG. 4]
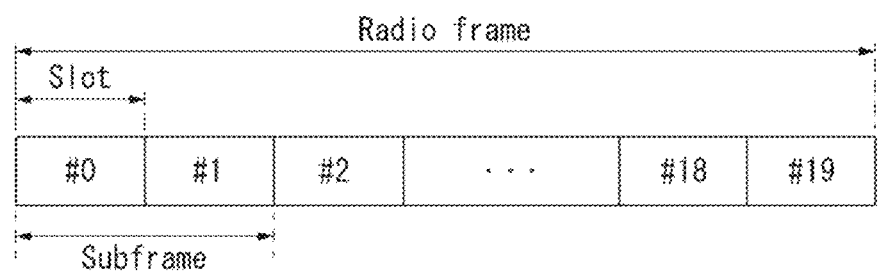

[FIG. 5]
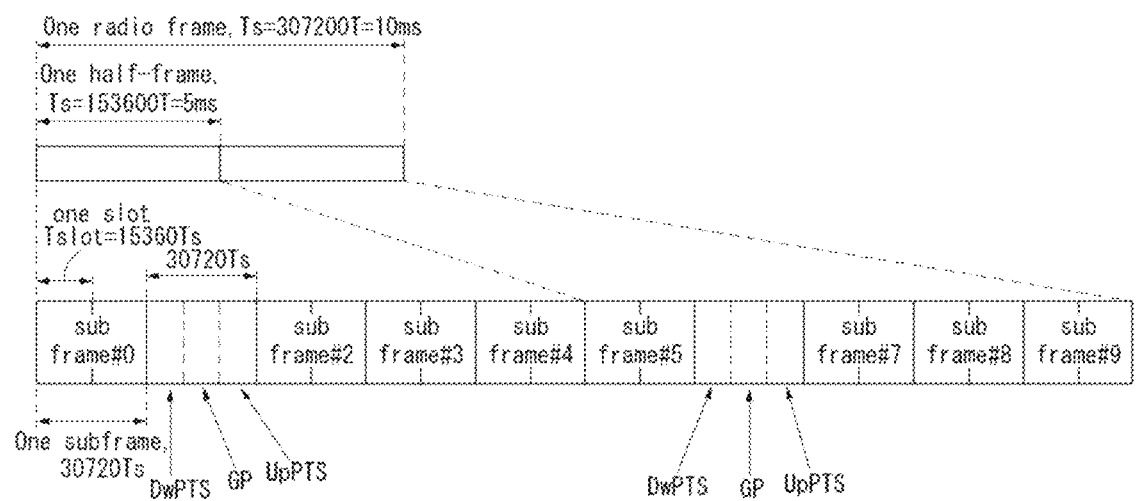

[FIG. 6]
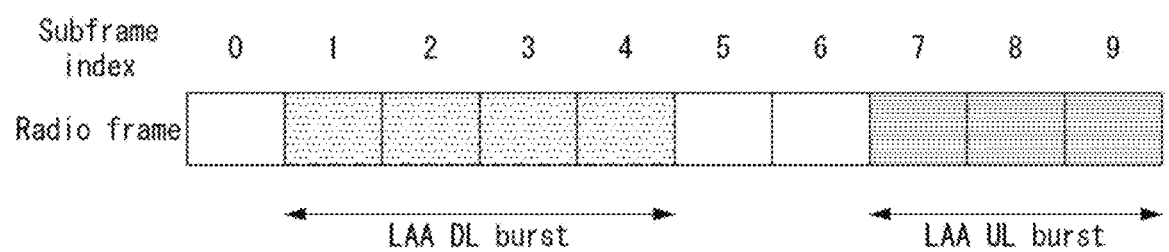

[FIG. 7]
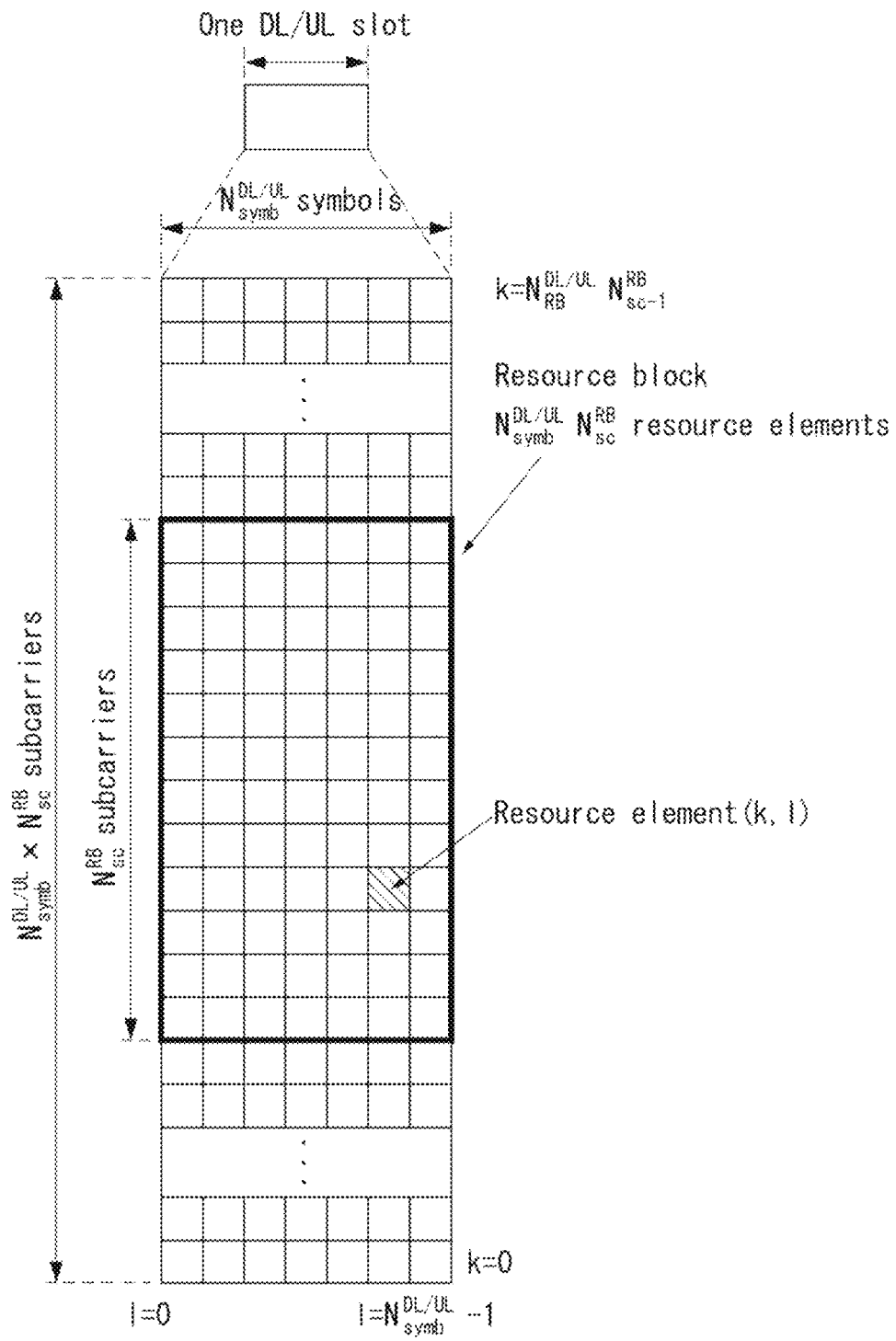

[FIG. 8]
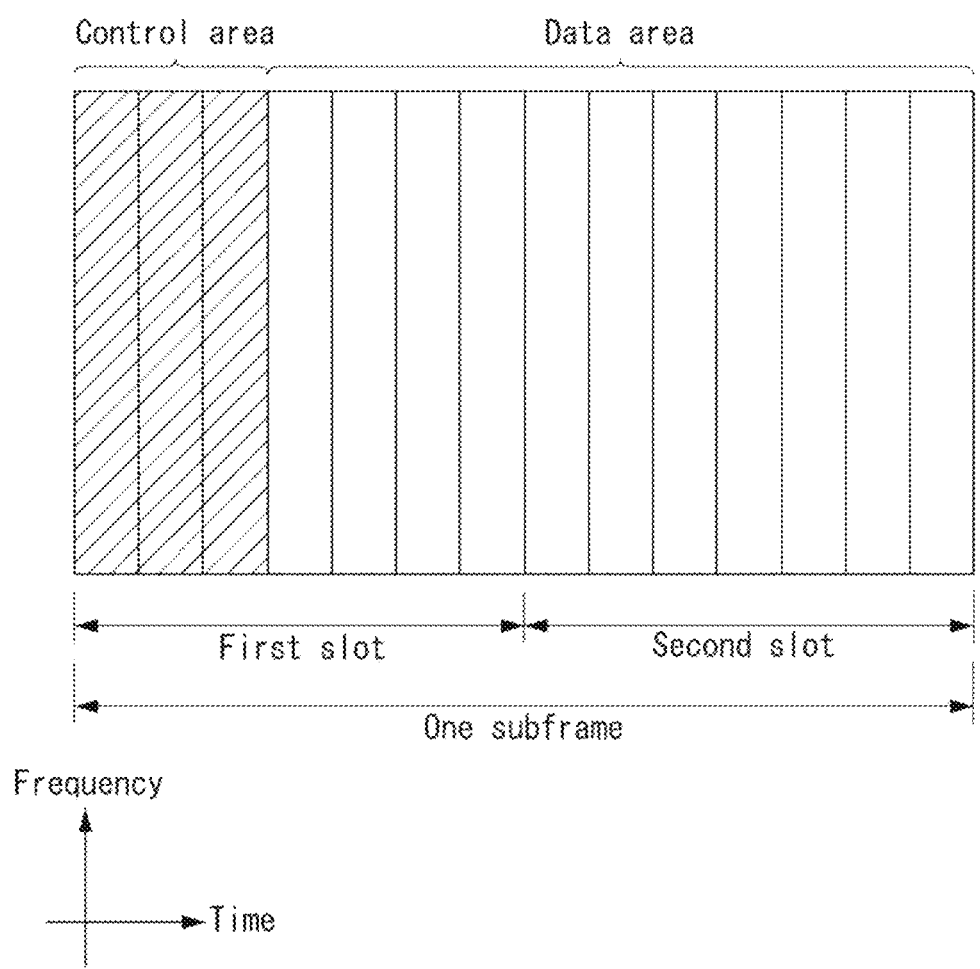

[FIG. 9]
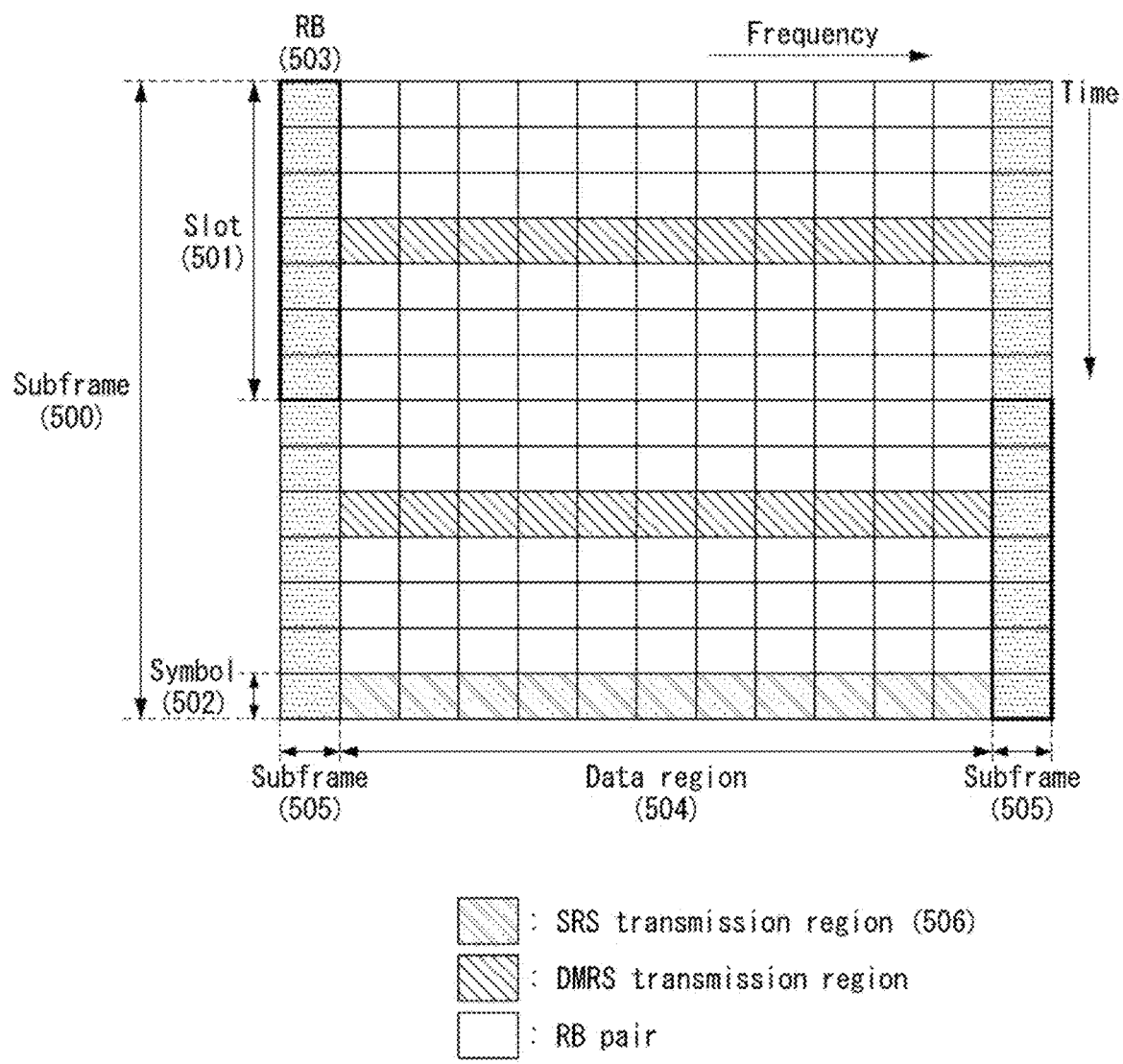

[FIG. 10]
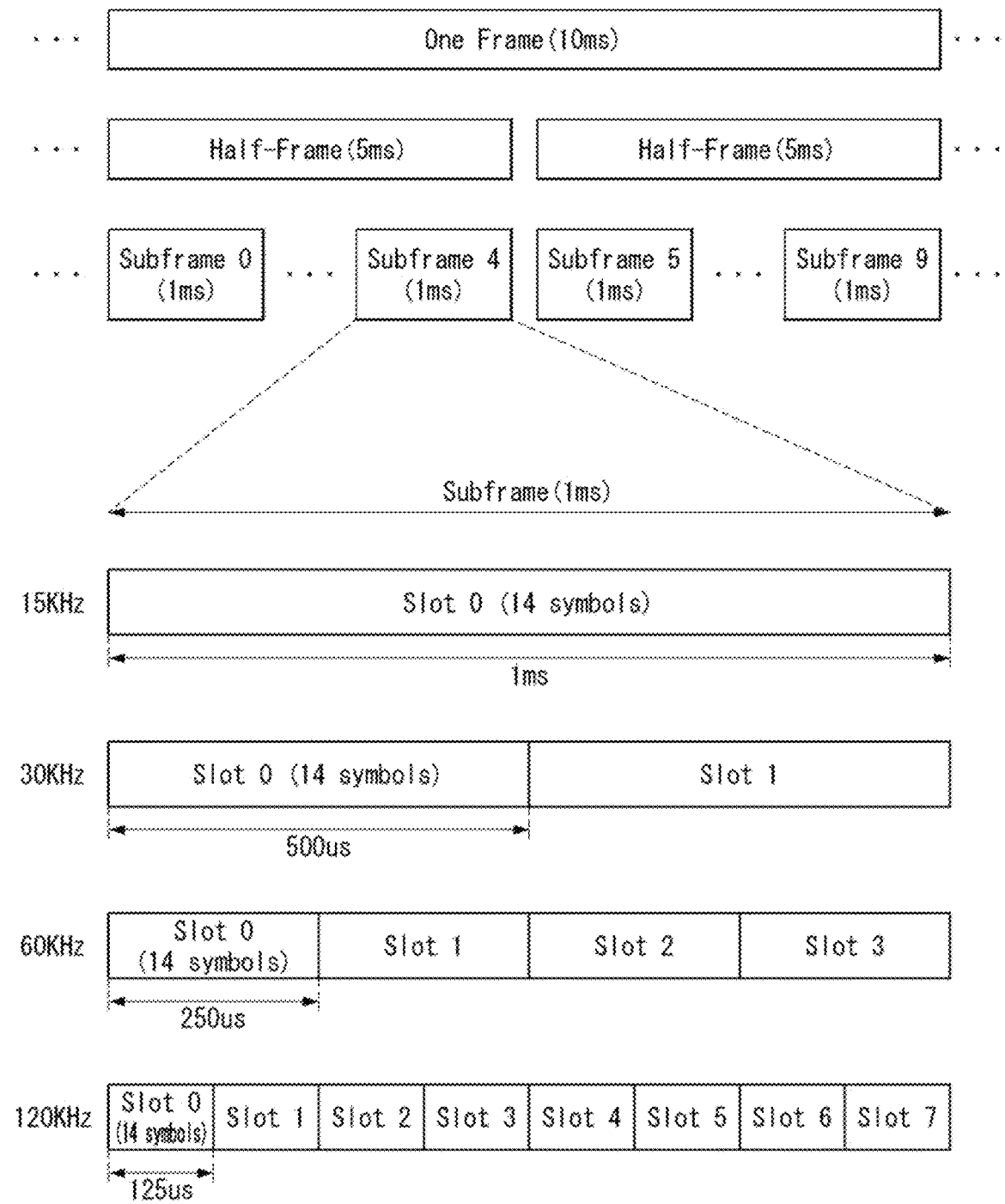

[FIG. 11]
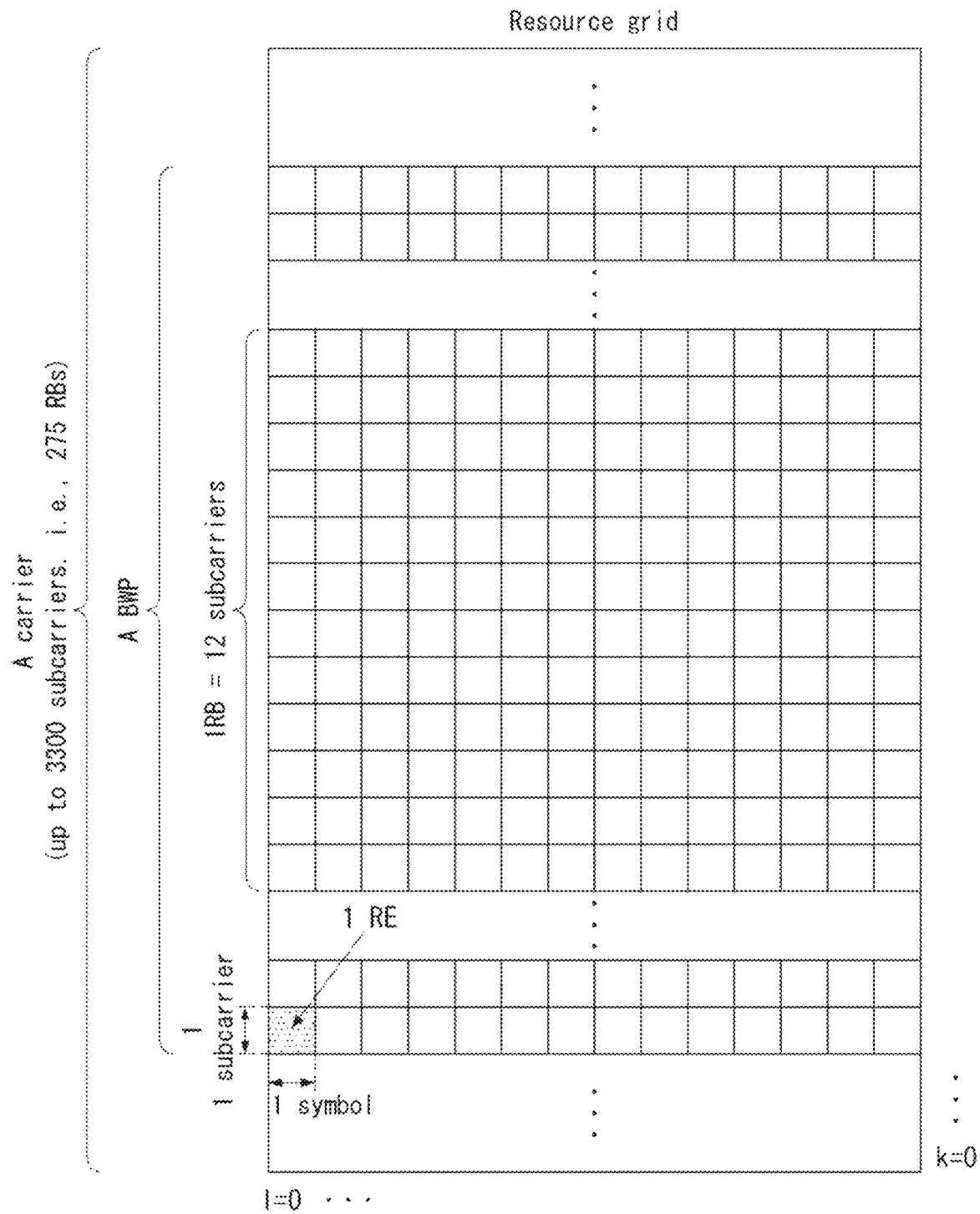

[FIG. 12]
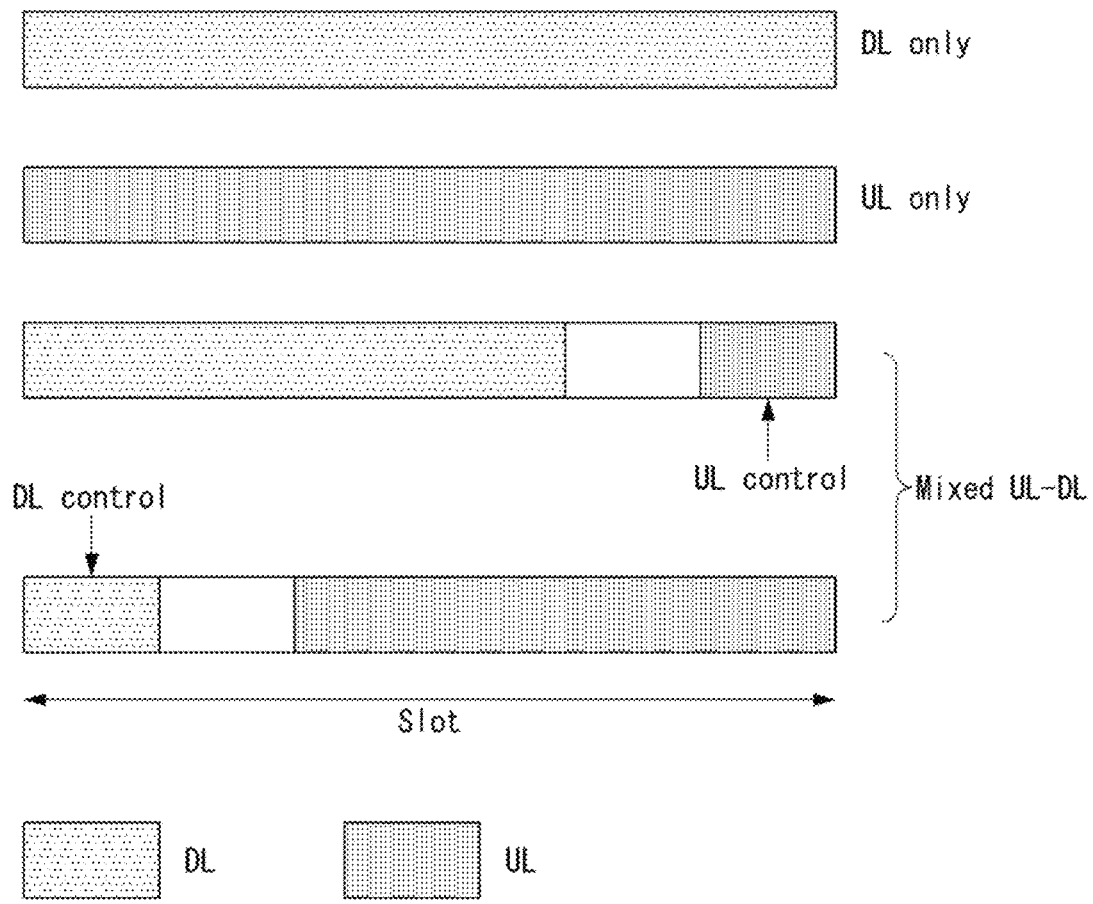

[FIG. 13]
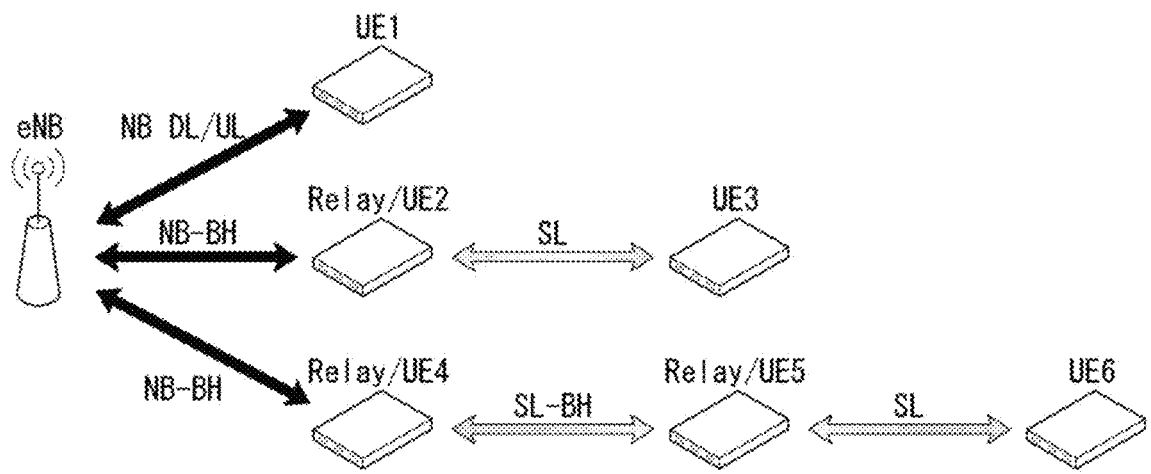

[FIG. 14]
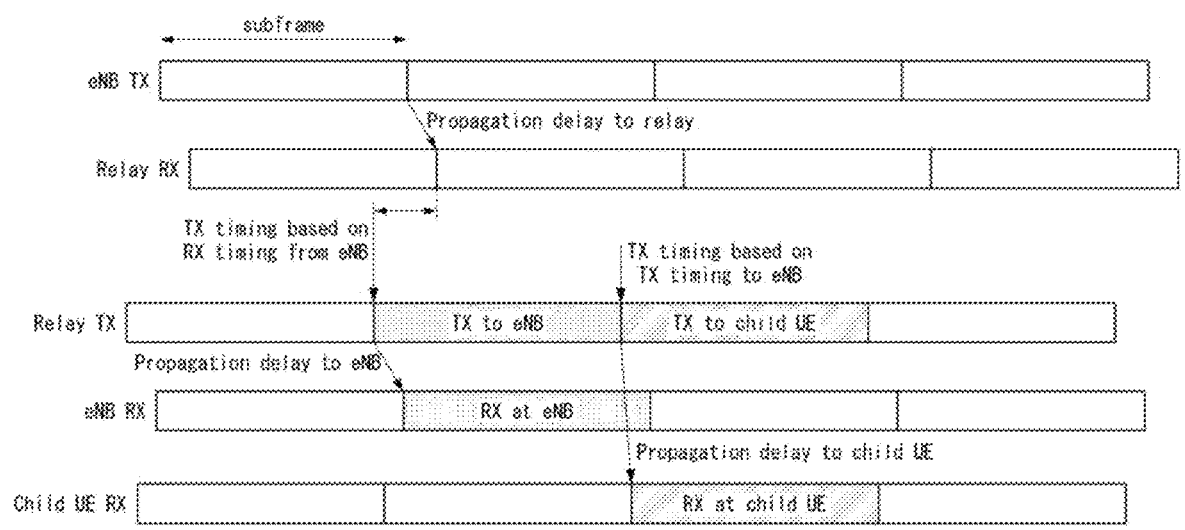

[FIG. 15]
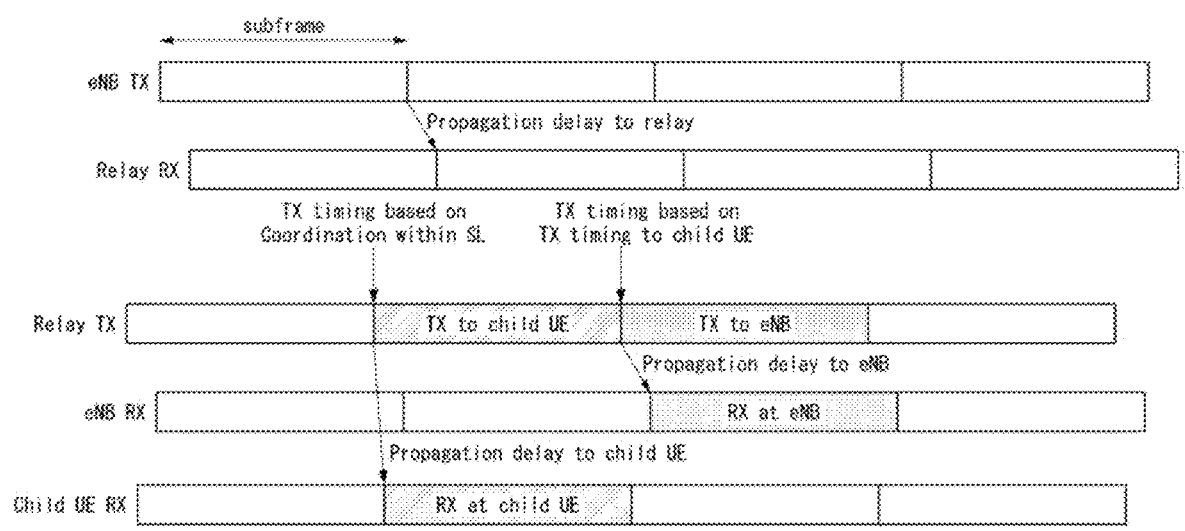

[FIG. 16]
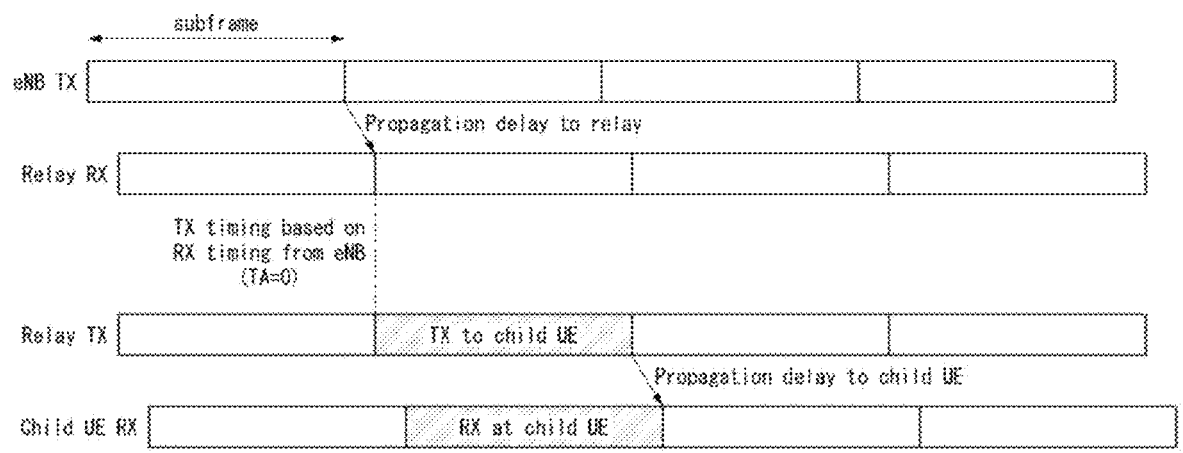

[FIG. 17]
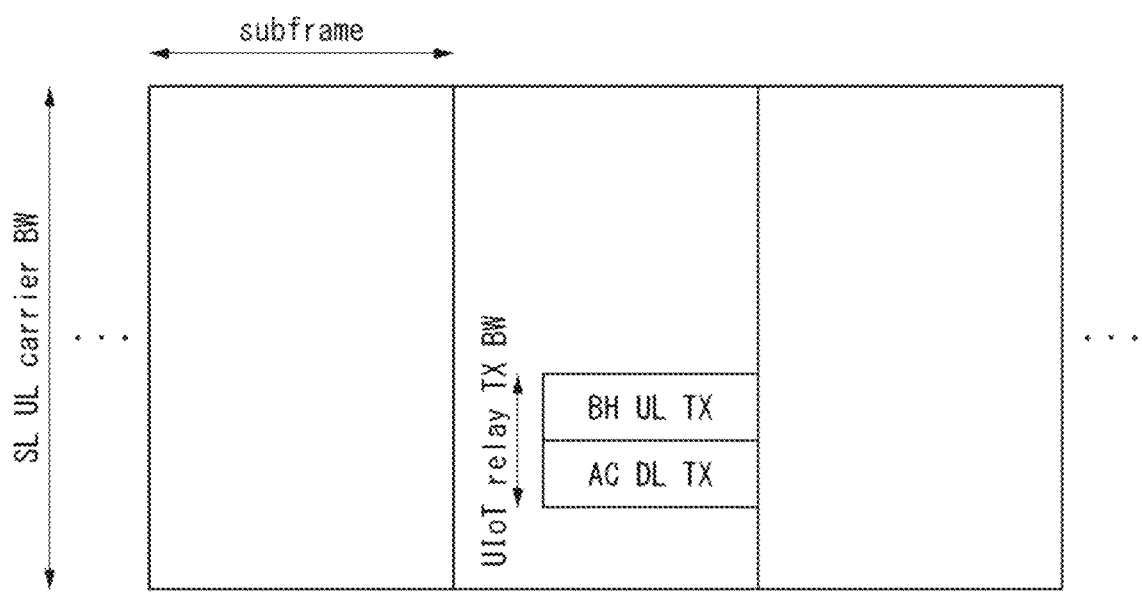

[FIG. 18]
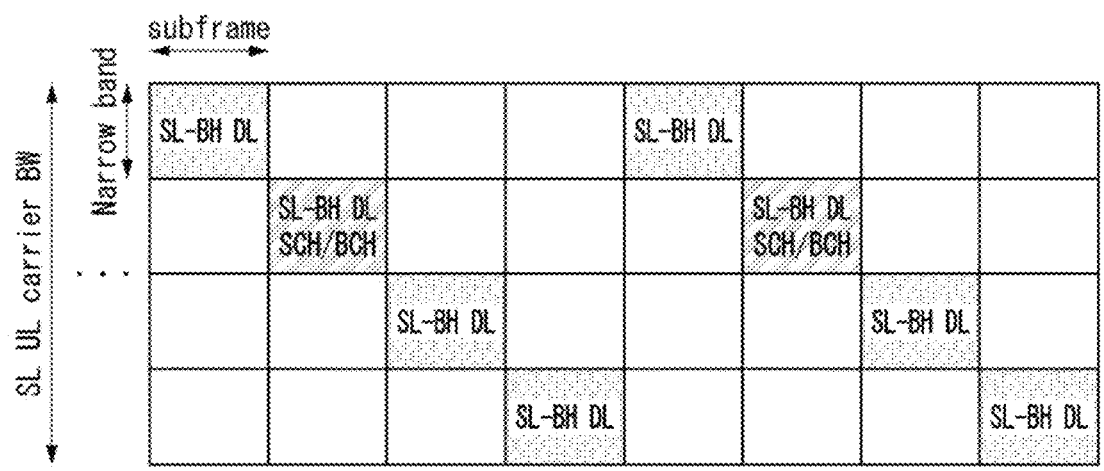

[FIG. 19]
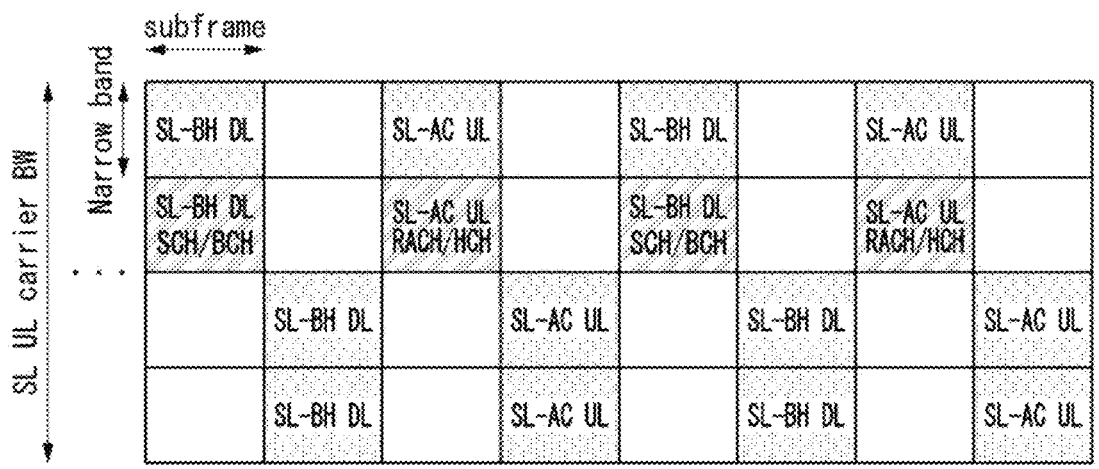

[FIG. 20]
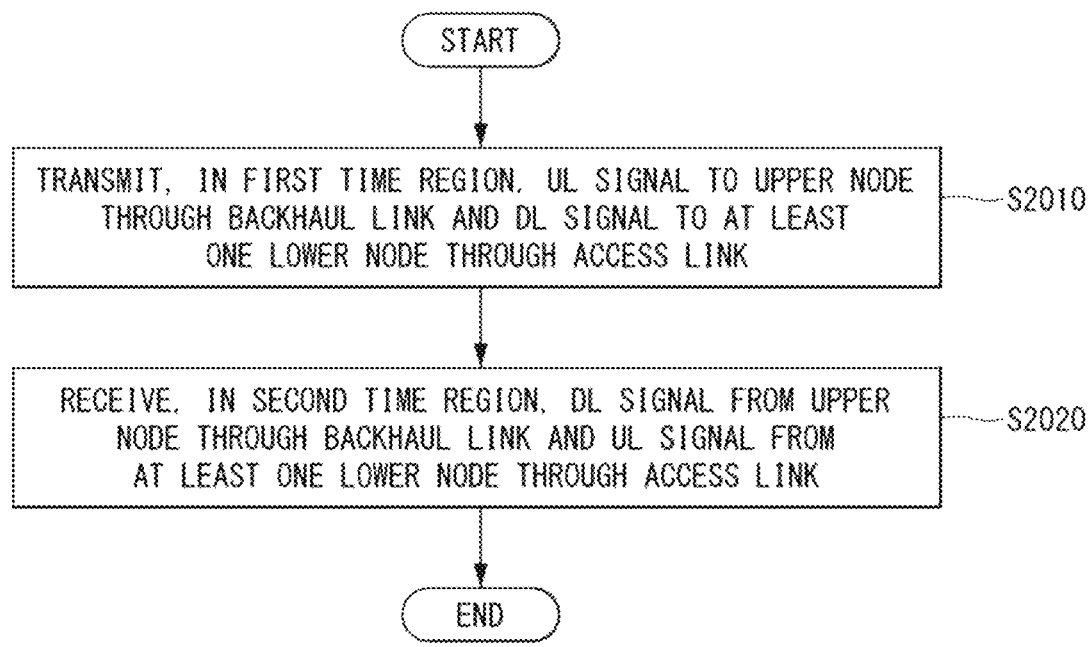

[FIG. 21]
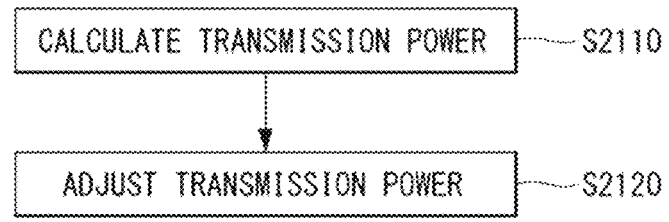

[FIG. 22]
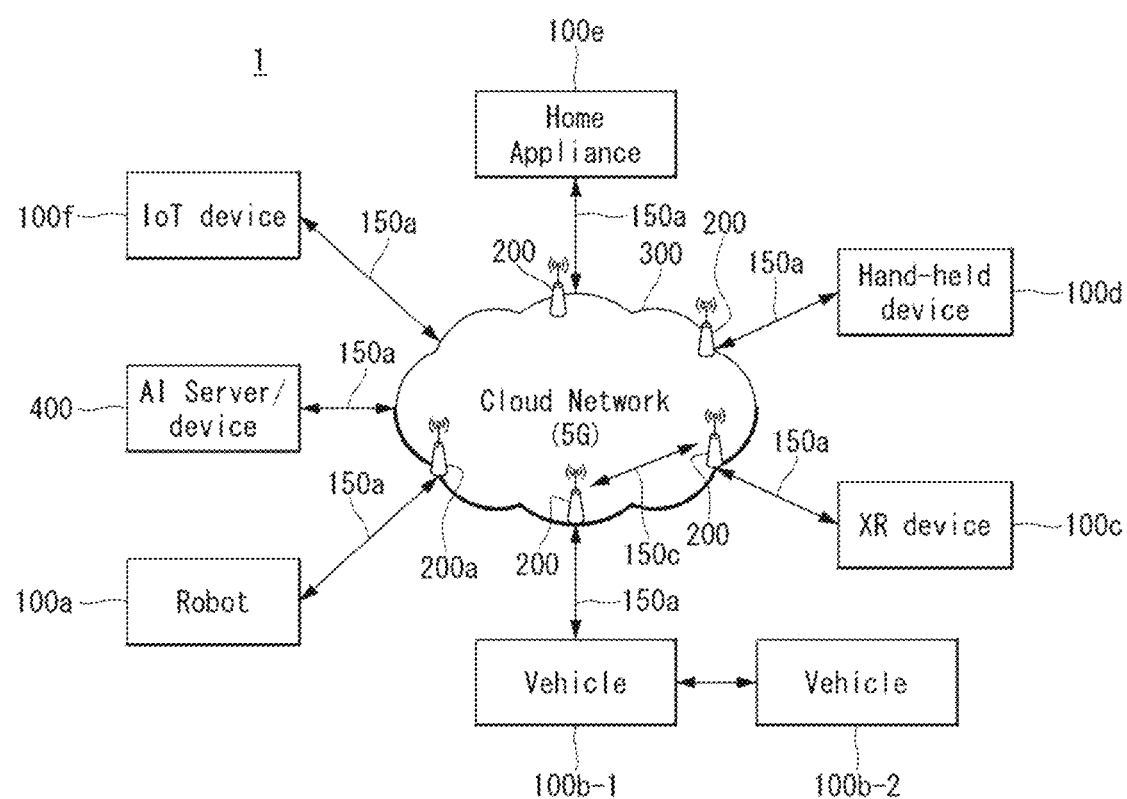

[FIG. 23]
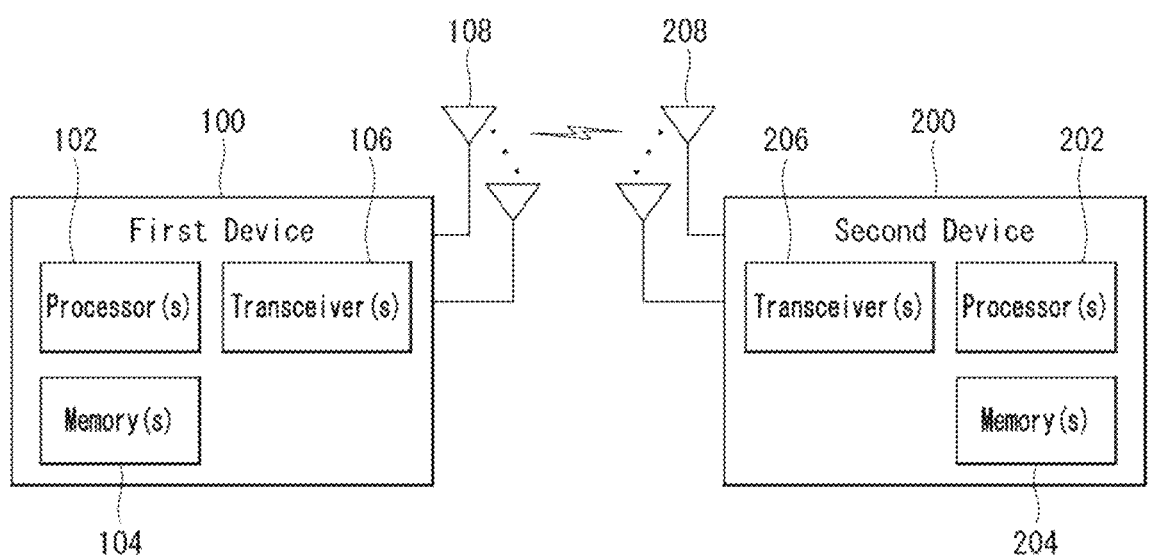

[FIG. 24]
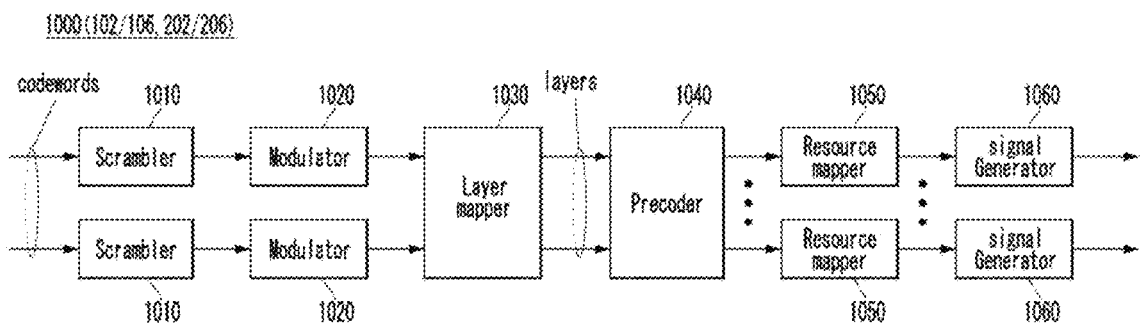

[FIG. 25]
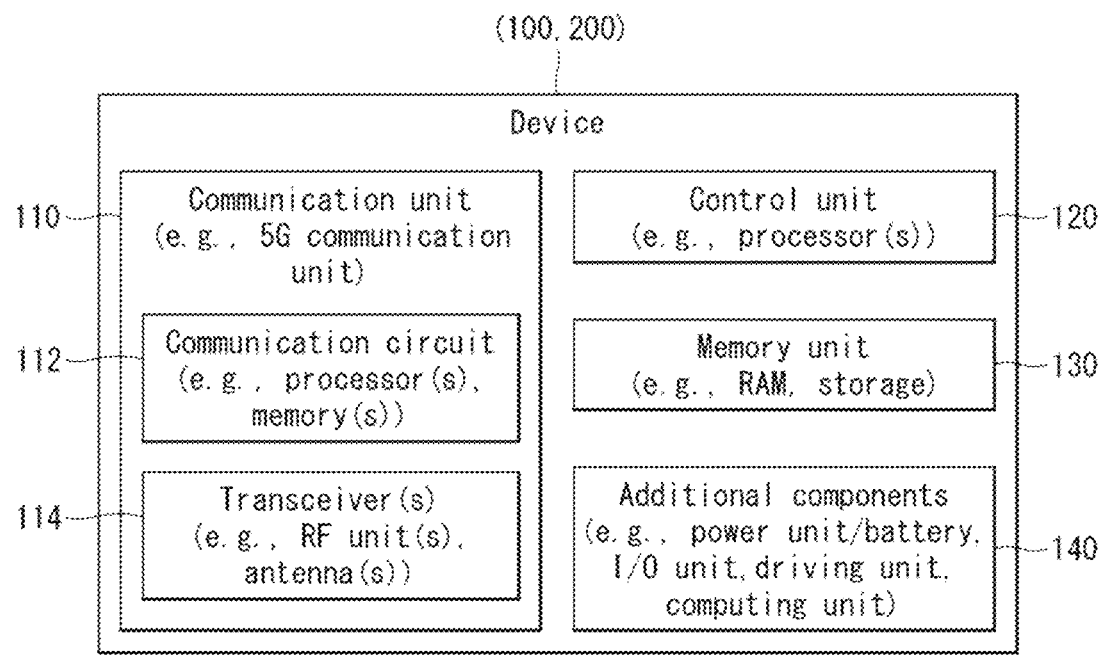

[FIG. 26]
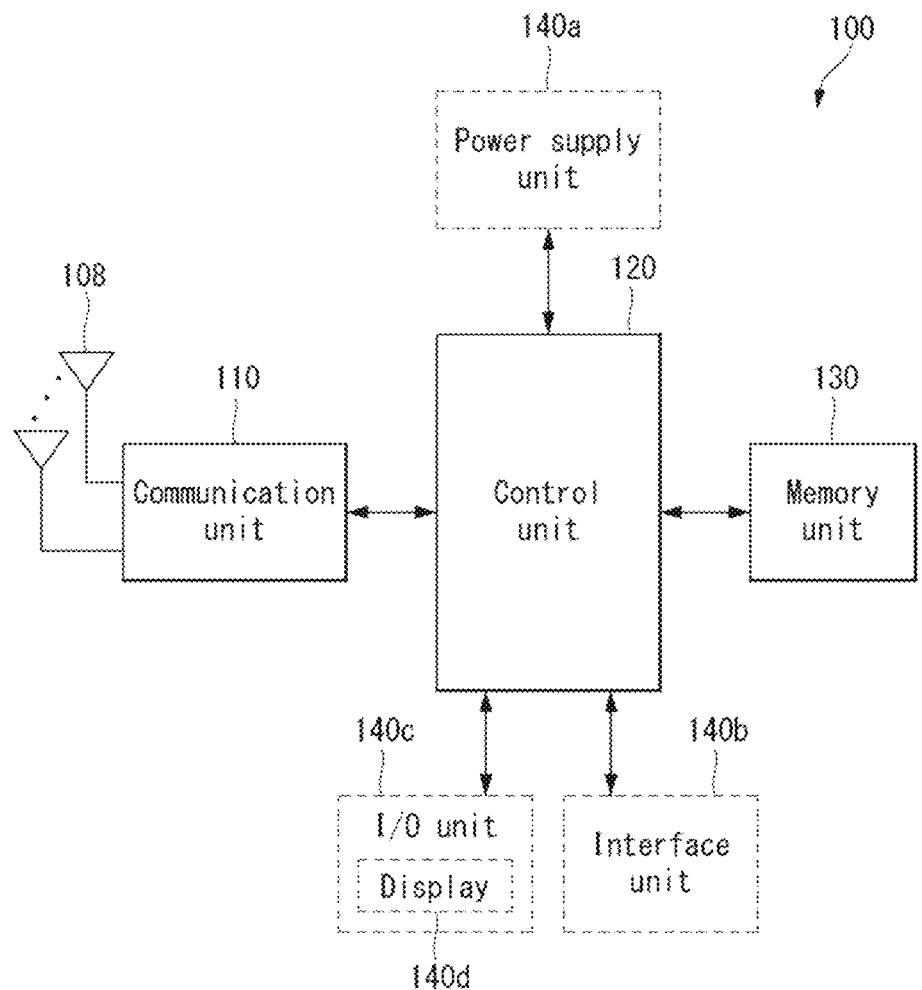

METHOD FOR RELAY TERMINAL TO TRANSMIT AND RECEIVE SIGNALS IN WIRELESS COMMUNICATION SYSTEM AND DEVICE FOR SAME

CROSS-REFERENCE TO RELATED APPLICATIONS

This application is the National Stage filing under 35 U.S.C. 371 of International Application No. PCT/KR2019/014160, filed on Oct. 25, 2019, which claims the benefit of earlier filing date and right of priority to KR Application No. 10-2018-0132620 filed on Oct. 31, 2018, the contents of which are all hereby incorporated by reference herein in their entirety.

TECHNICAL FIELD

The present disclosure provides a method for a relay terminal to transmit and receive signals in a wireless communication system and a device for the same.

BACKGROUND ART

Mobile communication systems were developed to ensure user activity and provide voice service. However, mobile communication systems have extended their range to data service as well as voice, and currently the explosive increase in traffic is causing a lack of resources and there is a users' demand for faster services, which is creating a need for advanced mobile communication systems.

The requirements for next-generation mobile communication systems largely include coping with explosive data traffic, very high data rates per user, coping with a surprisingly large number of connected devices, very low end-to-end latency, and support for high energy efficiency. To this end, research is ongoing on a variety of technologies such as dual connectivity, massive MIMO (massive multiple input multiple output), in-band full duplex, NOMA (non-orthogonal multiple access), support for super wideband, and device networking.

DISCLOSURE

Technical Problem

An object of the present disclosure is to propose a method of transmitting and receiving signals through a relay terminal and a device for the same.

Furthermore, an object of the present disclosure is to allow a relay terminal to transmit signals by considering transmission power.

Furthermore, an object of the present disclosure is to allow a relay terminal to obtain frequency diversity in transmitting and receiving signals.

Furthermore, an object of the present disclosure is to allow a relay terminal to obtain a sufficient throughput in supporting a traffic amount required for providing a relay service in transmitting and receiving signals.

Technical objects to be achieved by the present disclosure are not limited to the aforementioned technical objects, and other technical objects not described above may be evidently understood by a person having ordinary skill in the art to which the present disclosure pertains from the following description.

Technical Solution

According to an embodiment of the present disclosure, a method for a relay terminal to transmit and receive signals in a wireless communication system, which includes: transmitting, in first time region, a UL signal to an upper node through a backhaul link and a DL signal to at least one lower node through an access link; and receiving, in a second time region, a DL signal from the upper node through the backhaul link and a UL signal from the at least one lower node through the access link, in which different frequency resources are allocated to the UL signal and the DL signal in the same carrier in each of the first time region and the second time region.

The backhaul link and the access link are side links (SLs).

The method includes: calculating transmission power required for UL signal transmission through the backhaul link and transmission power required for DL signal transmission through the access link; and adjusting any one transmission power among the calculated transmission powers when a predetermined condition is satisfied.

The predetermined condition is satisfied when a sum of the calculated transmission powers exceeds a maximum transmission power of the relay terminal or a difference between the calculated transmission powers exceeds a specific value.

In the adjusting of the transmission power, a signal having a lower priority of the UL signal transmitted through the backhaul link and the DL signal transmitted through the access link is determined according to a predetermined priority, and transmission of the signal having the lower priority is abandoned or a transmission power of the corresponding signal is adjusted.

In the adjusting of the transmission power, of the UL signal transmitted through the backhaul link and the DL signal transmitted through the access link, 1) a signal corresponding to any one of a scheduling assignment channel (SACH), a scheduled data channel (DCH), or a direct data channel (dDCH), 2) the DL signal transmitted through the access link, and the signal corresponding to 1) or 2) above is determined as the signal having the lower priority.

The frequency resource includes at least one narrow band, and the at least one narrow band is frequency-hopped according to a specific hopping pattern.

A narrow band fixed to a specific frequency location is allocated to a Synchronization Channel (SCH) or a Broadcast data Channel (BCH) among the DL signals received through the backhaul link.

The frequency resource includes a plurality of narrow bands, and a specific signal among the signals transmitted or received through the backhaul link or the access link is transmitted or received through a specific narrow band among the plurality of narrow bands.

The specific signal is at least one of the synchronization channel (SCH), the broadcast data channel (BCH), a random access channel (RACH), or an HARQ feedback channel (HCH).

The specific narrow band is frequency-hopped according to a specific hopping pattern.

A relay terminal transmitting and receiving signals in a wireless communication system according to another embodiment of the present disclosure includes: a transceiver transmitting and receiving a radio signal; a memory; and a processor connected to the transceiver and the memory.

The processor is configured to transmit, in first time region, a UL signal to an upper node through a backhaul link and a DL signal to at least one lower node through an access link, and receive, in a second time region, a DL signal from the upper node through the backhaul link and a UL signal from the at least one lower node through the access link.

The different frequency resources are allocated to the UL signal and the DL signal in the same carrier in each of the first time region and the second time region.

The backhaul link and the access link are side links (SLs).

The processor is configured to calculate transmission power required for UL signal transmission through the backhaul link and transmission power required for DL signal transmission through the access link, and adjust any one transmission power among the calculated transmission powers when a predetermined condition is satisfied.

The predetermined condition is satisfied when a sum of the calculated transmission powers exceeds a maximum transmission power of the relay terminal or a difference between the calculated transmission powers exceeds a specific value.

Advantageous Effects

In a method for a relay terminal to transmit and receive signals in a wireless communication system and a device for the same according to an embodiment of the present disclosure, signals can be simultaneously transmitted and received through a backhaul link and an access link to which different frequency resources in the same carrier are allocated. Accordingly, according to the present disclosure, the frequency resource can be efficiently operated in providing a relay service.

In addition, according to an embodiment of the present disclosure, the relay terminal calculates a transmission power required for UL signal transmission through the backhaul link and the transmission power required for DL signal transmission through the access link, and adjusts any one transmission power according to whether a predetermined condition is satisfied. Therefore, according to the present disclosure, in performing simultaneous transmission of the backhaul link and the access link, a case where a maximum transmission power of the relay terminal is exceeded or a problem in which a difference between the calculated transmission powers exceeds a specific value, resulting in large interference between respective signals can be prevented.

Furthermore, according to an embodiment of the present disclosure, the relay terminal abandons transmission of a signal having a low priority or adjusts the transmission power of the corresponding signal in adjusting the transmission power. Accordingly, according to the present disclosure, it is possible to minimize degradation of a relay service quality due to execution of simultaneous transmission through the backhaul link and the access link.

Furthermore, according to an embodiment of the present disclosure, different frequency resources allocated to the backhaul link and the access link include at least one narrow band and are frequency-hopped according to a specific hopping pattern. Therefore, according to the present disclosure, in providing the relay service, an interference amount depending on a frequency location or an influence due to a radio channel characteristic can be reduced.

Furthermore, according to the present disclosure, frequency hopping is applied to a narrow band allocated to each signal in order to obtain frequency diversity, but in the case of a Synchronization Channel (SCH) or a Broadcast data Channel (BCH), a narrow band fixed to a specific frequency location is allocated so that the relay terminal easily detects the corresponding signal. Therefore, according to the present disclosure, operating efficiency of the relay terminal according to frequency hopping can be improved.

Furthermore, according to an embodiment of the present disclosure, different frequency resources allocated to the signals transmitted and received through the backhaul link and the access link include a plurality of narrow bands. Accordingly, according to the present disclosure, the relay service can be stably provided to a plurality of sub-nodes by utilizing an increased throughput.

Furthermore, according to an embodiment of the present disclosure, among the signals transmitted or received through the backhaul link or the access link, a specific signal is transmitted or received through a specific narrow band among the plurality of narrow bands. Accordingly, according to the present disclosure, a specific signal that can be transmitted or received through one narrow band is transmitted and received through a specific narrow band to more efficiently operate resources.

Effects which may be obtained by the present disclosure are not limited to the aforementioned effects, and other technical effects not described above may be evidently understood by a person having ordinary skill in the art to which the present disclosure pertains from the following description.

DESCRIPTION OF DRAWINGS

The accompanying drawings, which are included as part of the detailed description in order to help understanding regarding the present disclosure, provide embodiments of the present disclosure and describe the technical characteristics of the present disclosure along with the detailed description.

FIG. 1 illustrates an example of an LTE system architecture.

FIG. 2 illustrates an example of an NR system architecture.

FIG. 3 illustrates physical channels and general signal transmission used in a wireless system.

FIG. 4 illustrates frame type 1.

FIG. 5 illustrates frame type 2.

FIG. 6 illustrates frame type 3.

FIG. 7 illustrates a slot structure of an LTE frame.

FIG. 8 illustrates a structure of a downlink subframe used in LTE.

FIG. 9 illustrates a structure of an uplink subframe used in LTE.

FIG. 10 illustrates a structure of a radio frame used in NR.

FIG. 11 illustrates a slot structure of an NR frame.

FIG. 12 illustrates a structure of a self-contained slot.

FIG. 13 illustrates a relay network configuration to which the present disclosure is applied.

FIG. 14 is a diagram for describing determination of a transmission timing based on an NB-BH UL transmission timing according to an embodiment of the present disclosure.

FIG. 15 is a diagram for describing determination of a transmission timing based on an SL-AC DL transmission timing according to an embodiment of the present disclosure.

FIG. 16 is a diagram for describing determination of a transmission timing based on an NB-BH DL reception timing according to an embodiment of the present disclosure.

FIG. 17 is a diagram for describing simultaneous transmission through BH UL and AC DL according to an embodiment of the present disclosure.

FIG. 18 is a diagram for describing an operation related to narrow band hopping according to an embodiment of the present disclosure.

FIG. 19 is a diagram for describing a operation related to a plurality of narrow bands according to an embodiment of the present disclosure.

FIG. 20 is a flowchart for describing a method for a relay terminal to transmit and receive signals according to an embodiment of the present disclosure.

FIG. 21 is a flowchart for describing an operation related to transmission power adjustment in a method for a relay terminal to transmit and receive signals according to an embodiment of the present disclosure.

FIG. 22 illustrates a communication system 1 applied to the present disclosure.

FIG. 23 illustrates a wireless device applicable to the present disclosure.

FIG. 24 illustrates a signal processing circuit applied to the present disclosure.

FIG. 25 illustrates another example of a wireless device applied to the present disclosure.

FIG. 26 illustrates a portable device applied to the present disclosure.

MODE FOR DISCLOSURE

Hereinafter, preferred embodiments of the present disclosure will be described in detail with reference to the accompanying drawings. The detailed description, which will be given below with reference to the accompanying drawings, is intended to explain exemplary embodiments of the present disclosure and is not intended to represent the only embodiments in which the present disclosure may be practiced. The following detailed description includes specific details in order to provide a thorough understanding of the present disclosure. However, those skilled in the art appreciate that the present disclosure may be practiced without these specific details.

In some instances, well-known structures and devices may be omitted or shown in a block diagram form centering on the core functions of the structures and devices in order to avoid obscuring the concepts of the present disclosure.

In the present disclosure, a base station has a meaning as a terminal node of a network that directly communicates with a terminal. In the present disclosure, a specific operation described as being performed by the base station may be performed by an upper node of the base station in some cases. That is, it is apparent that various operations performed for communication with the terminal in the network constituted by multiple network nodes including the base station may be performed by the base station or network nodes other than the base station. A 'base station (BS)' may be replaced with terms including a fixed station, a Node B, an evolved-NodeB (eNB), a base transceiver system (BTS), an access point (AP), a next generation NB, and the like. Further, a 'terminal' may be fixed or mobile and may be replaced with terms including a user equipment (UE), a mobile station (MS), a user terminal (UT), a mobile subscriber station (MSS), a subscriber station (SS), an Advanced Mobile Station (WT), a Wireless Terminal (WT), a Machine-Type Communication (MTC) device, a Machine-to-Machine (M2M) device, and a Device-to-Device (D2D) device, and the like.

Hereinafter, downlink (DL) means communication from a base station to a terminal and uplink (UL) means communication from the terminal to the base station. In the downlink, a transmitter may be part of the base station, and a receiver may be part of the terminal. In the uplink, the transmitter may be part of the terminal and the receiver may be part of the base station.

Specific terms used in the following description are provided to help the understanding of the present disclosure, and the use of the specific terms may be changed to other forms without departing from the technical spirit of the present disclosure.

The following technology may be used for various multiple access schemes which include code division multiple access (CDMA), frequency division multiple access (FDMA), time division multiple access (TDMA), orthogonal frequency division multiple access (OFDMA), single carrier frequency division multiple access (SC-FDMA), non-orthogonal multiple access (NOMA), and the like. The CDMA may be implemented as radio technology such as universal terrestrial radio access (UTRA) or CDMA2000. The TDMA may be implemented as radio technology such as global system for mobile communications (GSM)/general packet radio service (GPRS)/enhanced data rates for GSM evolution (EDGE). The OFDMA may be implemented as radio technology such as Institute of Electrical and Electronics Engineers (IEEE) 802.11 (Wi-Fi), IEEE 802.16 (WiMAX), IEEE 802, Evolved UTRA (E-UTRA), or the like. The UTRA is part of Universal Mobile Telecommunications System (UMTS). 3rd Generation Partnership Project (3GPP) Long Term Evolution (LTE) as a part of Evolved UMTS (E-UMTS) using the E-UTRA adopts OFDMA in downlink and adopts SC-FDMA in uplink. LTE-Advanced (A) is evolution of LTE.

Embodiments of the present disclosure may be supported by standard documents disclosed in at least one of wireless access systems IEEE 802, 3GPP, and 3GPP2. That is, steps or portions of the embodiments of the present disclosure which are not described in order to clearly illustrate the technical spirit of the present disclosure may be supported by the documents. Further, all terms disclosed in the present disclosure may be described by the standard document.

For clarity of description, 3GPP LTE/LTE-A is mainly described, but the technical features of the present disclosure are not limited thereto.

A. System Architecture

FIG. 1 illustrates an example of an LTE system architecture.

A wireless communication system may be referred to as an evolved-UMTS terrestrial radio access network (E-UTRAN) or long term evolution (LTE)/LTE-A system. Referring to FIG. 1, the E-UTRAN includes at least one base station (e.g., BS) 20 providing a control plane and a user plane to a terminal (e.g., UE) 10.

The UE 10 may be fixed or mobile, and may be referred to as other terms such as a mobile station (MS), a user terminal (UT), a subscriber station (SS), a mobile terminal (MT), a wireless device, etc.

The BS 20 as a fixed station which communicates with the UE 10 may be generally referred to as evolved Node-B (eNB), general Node-B (gNB), base transceiver system (BTS), access point (AP), etc. The BSs are connected to each other through an X2 interface. The BSs are connected to an evolved packet core (EPC) through an S1 interface, more particularly, to a mobility management entity (MME) through S1-MME and a serving gateway (S-GW) through S1-U.

The EPC includes the MME, the S-GW, and a packet data network-gateway (P-GW). The layer of a radio interface protocol between the UE and the network may be classified by using first layer (L1), second layer (L2), and third layer (L3) models based on lower 3 layers of Open System Interconnection (OSI) well known in a communication system. Among them, a physical layer PHY which belongs to the first layer provides information transmission service by using a physical channel and a Radio Resource Control (RRC) layer which belongs to the third layer controls radio resources between the UE and the network. To this end, the RRC layer exchanges an RRC message between the UE and the BS.

FIG. 2 illustrates an example of an NR system architecture.

Referring to FIG. 2, NG-RAN is constituted by gNBs providing a control plane (RRC) protocol end for an NG-RA user plane (new AS sublayer/PDCP/RLC/MAC/PHY) and a user equipment (UE). The gNBs are interconnected through an Xn interface. The gNB is also connected to NGC through an NG interface. More specifically, the gNB is connected to an Access and Mobility Management Function (AMF) through an N2 interface and a User Plane Function (UPF) through an N3 interface.

B. Physical Channel and Frame Structure

Physical Channel and General Signal Transmission

FIG. 3 illustrates physical channels and general signal transmission used in a 3GPP system.

In the wireless communication system, the UE receives information from the BS through Downlink (DL) and the UE transmits information to the BS through Uplink (UL). The information which the BS and the UE transmit and receive includes data and various control information and there are various physical channels according to a type/use of the information which the BS and the UE transmit and receive.

A UE that is powered on again while being powered off or enters a new cell performs an initial cell search operation such as synchronizing with the BS (S11). To this end, the UE receives a Primary Synchronization Channel (PSCH) and a Secondary Synchronization Channel (SSCH) from the BS to synchronize with the BS and obtain information such as a cell identity (ID), etc. Furthermore, the UE receives a Physical Broadcast Channel (PBCH) from the BS to acquire in-cell broadcast information. Furthermore, the UE receives a Downlink Reference Signal (DL RS) in an initial cell search step to check a downlink channel state.

Upon completion of the initial cell search, the UE receives a Physical Downlink Control Channel (PDCCH) and a Physical Downlink Control Channel (PDSCH) corresponding thereto to acquire more specific system information (S12).

Thereafter, the UE may perform a random access procedure in order to complete an access to the BS (S13 to S16). Specifically, the UE may transmit a preamble through a Physical Random Access Channel (PRACH) (S13) and receive a Random Access Response (RAR) for the preamble through the PDCCH and the PDSCH corresponding thereto (S14). Thereafter, the UE may transmit a Physical Uplink Shared Channel (PUSCH) by using scheduling information in the RAR (S15) and perform a Contention Resolution Procedure such as the PDCCH and the PDSCH corresponding thereto (S16).

The UE that performs the above-described procedure may then perform reception of the PDCCH/PDSCH (S17) and transmission of PUSCH/Physical Uplink Control Channel (PUCCH) (S18) as the general uplink/downlink signal transmission procedure. Control information transmitted from the UE to the BS is referred to as uplink control information (UCI). The UCI includes Hybrid Automatic Repeat and reQuest Acknowledgement/Negative-ACK (HARQ ACK/NACK), Scheduling Request (SR), Channel State Information (CSI), etc. The CSI includes a Channel Quality Indicator (CQI), a Precoding Matrix Indicator (PMI), Rank Indicator (RI), etc. The UCI is generally transmitted through the PUCCH, but may be transmitted through the PUSCH when the control information and data are to be transmitted simultaneously. Furthermore, the UE may transmit the UCI aperiodically through the PUSCH according to a request/instruction of the network.

The description of physical channels and general signal transmission described in FIG. 3 may be equally applied to MTC and NB-IoT to be described later, and names of the physical channels may be replaced with names defined in the MTC and the NB-IoT.

Radio Frame Structure

FIGS. 4 to 6 illustrate an LTE radio frame structure. LTE supports frame type 1 for frequency division duplex (FDD), frame type 2 for time division duplex (TDD), and frame type 3 for unlicensed cell (UCell). In addition to Primary Cell (PCell), up to 31 Secondary Cells (SCells) may be aggregated. Unless particularly specified, operations described below may be independently applied for each cell. In multi-cell aggregation, different frame structures may be used in different cells. In addition, time resources (e.g., subframes, slots, subslots) in the frame structure may be collectively referred to as a Time Unit (TU).

FIG. 4 illustrates frame type 1.

A downlink radio frame is defined as 10 1 ms subframes (SFs). The subframe includes 14 or 12 symbols according to a cyclic prefix (CP). When a normal CP is used, the subframe includes 14 symbols. When an extended CP is used, the subframe includes 12 symbols. The symbol may mean an OFDM(A) symbol or an SC-FDM(A) symbol according to a multiple access scheme. For example, the symbol may mean an OFDM(A) symbol in downlink or an SC-FDM(A) symbol in uplink. The OFDM(A) symbol may be referred to as a Cyclic Prefix-OFDM(A) (CP-OFDM(A)) symbol, and the SC-FDM(A) symbol may be referred to as Discrete Fourier Transform-spread-OFDM(A) (DFT-s-OFDM(A)) symbol.

The subframe may be defined as one or more slots as below according to a subcarrier spacing (SCS).

In the case of SCS=7.5 kHz or 15 kHz, subframe #i is defined as two 0.5 ms slots #2i and #2i+1 (i=0 to 9).

In the case of SCS=1.25 kHz, subframe #i is defined as one 1 ms slot #2i.

In the case of SCS=15 kHz, subframe #i may be defined as six subslots as shown in Table A1.

Table 1 shows a subslot configuration in the subframe (normal CP).

TABLE 1

| Subslot number | 0 | 1 | 2 | 3 | 4 | 5 |
|---|---|---|---|---|---|---|
| Slot number | | | 2i | | 2i + 1 | |
| Uplink subslot pattern (Symbol number) | 0, 1, 2 | 3, 4 | 5, 6 | 0, 1 | 2, 3 | 4, 5, 6 |
| Downlink subslot pattern 1 (Symbol number) | 0, 1, 2 | 3, 4 | 5, 6 | 0, 1 | 2, 3 | 4, 5, 6 |
| Downlink subslot pattern 2 (Symbol number) | 0, 1 | 2, 3, 4 | 5, 6 | 0, 1 | 2, 3 | 4, 5, 6 |

FIG. 5 illustrates frame type 2.

Frame type 2 is constituted by two half frames. The half frame includes 4 (or 5) general subframes and 1 (or 0) special subframe. The general subframe is used for uplink or downlink according to an Uplink-Downlink Configuration (UL-DL configuration). The subframe is constituted by two slots.

Table 2 below shows the subframe configuration in the radio frame according to the UL-DL configuration.

TABLE 2

| Uplink-downlink configuration | Downlink-to-Uplink Switch point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Here, D represents a DL subframe, U represents a UL subframe, and S represents a special subframe. The special subframe includes a Downlink Pilot TimeSlot (DwPTS), a Guard Period (GP), and an Uplink Pilot TimeSlot (UpPTS). The DwPTS is used for initial cell search, synchronization, or channel estimation in the UE. The UpPTS is used to match the channel estimation at the BS and uplink transmission synchronization of the UE. The GP is a period for eliminating interference caused in the uplink due to a multi-path delay of a downlink signal between the uplink and the downlink.

Table 3 shows the configuration of the special subframe.

TABLE 3

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | (1 + X) · 2192 · $T_s$ | (1 + X) · 2560 · $T_s$ | 7680 · $T_s$ | (1 + X) · 2192 · $T_s$ | (1 + X) · 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | (2 + X) · 2192 · $T_s$ | (2 + X) · 2560 · $T_s$ |
| 5 | 6592 · $T_s$ | (2 + X) · 2192 · $T_s$ | (2 + X) · 2560 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |
| 10 | 13168 · $T_s$ | 13152 · $T_s$ | 12800 · $T_s$ | — | — | — |

Here, X is configured by a higher layer (e.g., RRC) signal or given as 0.

FIG. 6 illustrates frame type 3.

Frame type 3 may be applied to a UCell operation. Although not limited thereto, frame type 3 may be applied only to an operation of Licensed Assisted Access (LAA) SCell having the normal CP. The frame has a length of 10 ms and is defined as 10 1 ms subframes. Subframe #i is defined as two consecutive slots #2i and #2i+1. Each subframe in the frame may be used for downlink or uplink transmission or may be empty. The downlink transmission occupies one or more consecutive subframes, and starts from a random time point of the subframe and ends at a subframe boundary or DwPTS of Table 3. The uplink transmission occupies one or more consecutive subframes.

FIG. 7 illustrates a slot structure of an LTE frame.

Referring to FIG. 7, the slot includes a plurality of symbols in the time domain and a plurality of resource blocks (RBs) in the frequency domain. The symbol may mean a symbol period. The slot of the slot may be expressed by a resource grid constituted by $N^{DL/UL}_{RB} \times N^{RB}_{sc}$ subcarriers and $N^{DL/UL}_{symb}$ symbols. Here, $N^{DL}_{RB}$ represents the number of RBs in a downlink slot and $N^{UL}_{RB}$ represents the number of RBs in a UL slot. $N^{DL}_{RB}$ and $N^{UL}_{RB}$ depend on a DL bandwidth and a UL bandwidth, respectively. $N^{DL}_{symb}$ represents the number of symbols in the DL slot and $N^{DL}_{symb}$ represents the number of symbols in the UL slot. $N^{RB}_{sc}$ represents the number of subcarriers constituting the RB. The number of symbols in the slot may be variously changed according to the SCS and the CP length (see Table 1). For example, in the case of the normal CP, one slot includes 7 symbols, but in the case of the extended CP, one slot includes 6 symbols.

The RB is defined by $N^{DL/UL}_{symb}$ (e.g., 7) consecutive symbols in the time domain and defined by $N^{RB}_{sc}$ (e.g., 12) consecutive subcarriers in the frequency domain. Here, the RB may mean a physical resource block (PRB) or a virtual resource block (VRB) and the PRB and the VRB may be mapped 1:1. One pair of two RBs located in each of two slots of the subframe is referred to as an RB pair. Two RBs constituting the RB pair have the same RB number (or also referred to as an RB index). A resource constituted by one symbol and one subcarrier is referred to as a resource element (RE) or tone. Each RE in the resource element may be uniquely defined by an in-slot index pair (k, l). k represents an index granted from 0 to $N^{DL/UL}_{RB} \times N^{RB}_{sc} - 1$ in the frequency domain and l represents an index granted from 0 to $N^{DL/UL}_{symb} - 1$.

FIG. 8 illustrates a structure of a downlink subframe used in LTE.

Referring to FIG. 8, a maximum of three(or four) OFDM (A) symbols located in a front portion of a first slot within a subframe correspond to a control region to be assigned with a control channel. The remaining OFDM(A) symbols correspond to a data region to be assigned with a physical downlink shared chancel (PDSCH). The downlink control channels includes a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/not-acknowledgment (NACK) signal. Control information transmitted through the PDCCH is referred to as downlink control information (DCI). The DCI includes uplink or downlink scheduling information or includes an uplink transmit (Tx) power control command for arbitrary UE groups.

FIG. 9 illustrates a structure of an uplink subframe used in LTE.

Referring to FIG. 9, a subframe 500 is constituted by two 0.5 ms slots 501. Each slot is constituted by a plurality of symbols 502 and one symbol corresponds to one SC-FDMA symbol. An RB 503 is a resource allocation unit corresponding to 12 subcarriers in a frequency domain and one slot in a time domain. The structure of the uplink subframe of LTE is largely divided into a data area 504 and a control area 505. The data area refers to a communication resource used to transmit data such as voice and packet transmitted to each UE and includes a physical uplink shared channel (PUSCH). The control area refers to a communication resource used to transmit an uplink control signal, for example, a downlink channel quality report from each UE, a reception ACK/NACK for a downlink signal, an uplink scheduling request, etc., and includes a physical uplink control channel (PUCCH). A sounding reference signal (SRS) is transmitted through an SC-FDMA symbol located last on a time axis in one subframe.

FIG. 10 illustrates a structure of a radio frame used in NR.

In NR, uplink and downlink transmission is configured by the frame. The radio frame has a length of 10 ms and is defined as two 5 ms half-frames (HFs). The half-frame is defined as 5 1 ms subframes (SFs). The subframe is split into one or more slits and the number of slots in the subframe depends on the subcarrier spacing (SCS). Each slot includes 12 or 14 OFDM(A) symbols according to a cyclic prefix (CP). When a normal CP is used, each slot includes 14 symbols. When an extended CP is used, each slot includes 12 symbols. Here, the symbol may include an OFDM symbol (or CP-OFDM symbol) and an SC-FDMA symbol (or DFT-s-OFDM symbol).

Table 4 below shows that when the normal CP is used, the number of symbols for each slot, the number of slots for each frame, and the number of slots for each subframe vary according to the SCS.

TABLE 4

| SCS ($15*2^u$) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

$N^{slot}_{symb}$: The number of symbols in slot $N^{frame, u}_{slot}$: The number of slots in frame $N^{subframe, u}_{slot}$: The number of slots in subframe Table 5 below shows that when the extended CP is used, the number of symbols for each slot, the number of slots for each frame, and the number of slots for each subframe vary according to the SCS.

TABLE 5

| SCS ($15*2^u$) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

In the NR system, OFDM(A) numerology (e.g., SCS, CP length, etc.) may be differently set between a plurality of cells merged into one UE. As a result, an (absolute time) section of the time resource (e.g., SF, slot or TTI) (for convenience, collectively referred to as Time Unit (TU)) constituted by the same number of symbols may be configured differently between the merged cells.

FIG. 11 illustrates a slot structure of an NR frame.

The slot includes a plurality of symbols in the time domain. For example, in the case of the normal CP, one slot includes 7 symbols, but in the case of the extended CP, one slot includes 6 symbols. A carrier includes a plurality of subcarriers in the frequency domain. The resource block (RB) is defined as a plurality of (e.g., 12) consecutive subcarriers in the frequency domain. A bandwidth part (BWP) may be defined as a plurality of consecutive (P)RBs in the frequency domain and may correspond to one numerology (e.g., SCS, CP length, etc.). The carrier may include a maximum of N (e.g., 5) BWPs. Data communication may be performed through an activated BWP, and only one BWP may be activated in one UE. In a resource grid, each element is referred to as a resource element (RE) and one complex symbol may be mapped.

FIG. 12 illustrates a structure of a self-contained slot.

In the NR system, a frame is characterized by a self-complete structure in which all of a DL control channel, DL or UL data, and UL control channel may be included in one slot. For example, first N symbols in the slot may be used to transmit a DL control channel (hereinafter, referred to as a DL control area), and last M symbols in the slot may be used to transmit a UL control channel (hereinafter, a UL control area). N and M are each an integer of 0 or more. A resource region (hereinafter, referred to as the data area) between the DL control area and the UL control area may be used for DL data transmission or UL data transmission. As an example, the following configuration may be considered. Each period is listed in chronological order.

1. DL only configuration
2. UL only configuration
3. Mixed UL-DL configuration

DL area+Guard Period (GP)+UL control area

DL control area+Guard Period (GP)+UL control area

DL area: (i) DL data area, (ii) DL control area+DL data area

UL area: (i) DL data area, (ii) DL data area+DL control area

The PDCCH may be transmitted in the DL control area, and the PDSCH may be transmitted in the DL data area. The PUCCH may be transmitted in the UL control area, and the PUSCH may be transmitted in the UL data area. In the PDCCH, downlink control information (DCI), e.g., DL data scheduling information, UL data scheduling information, etc., may be transmitted. In PUCCH, uplink control information (UCI), e.g., Positive Acknowledgement/Negative Acknowledgement (ACK/NACK) information, Channel State Information (CSI) information, Scheduling Request (SR), etc., for DL data may be transmitted. The GP provides a time gap in the process of switching the BS and the UE from the transmission mode to the reception mode or the process of switching from the reception mode to the transmission mode. Some symbols at a switching timing from DL to UL may be configured as GP.

C. MTC (Machine Type Communication)

The Machine Type Communication (MTC) refers to communication technology adopted by 3rd Generation Partnership Project (3GPP) to meet Internet of Things (IoT) service requirements. Since the MTC does not require high throughput, it may be used as an application for machine-to-machine (M2M) and Internet of Things (IoT).

The MTC may be implemented to satisfy the following requirements: (i) low cost and low complexity; (ii) enhanced coverage; and (iii) low power consumption.

Table 7 shows the frequency ranges (FRs) defined for the NR.

TABLE 7

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Table 8 shows an example of the maximum transmission bandwidth configuration (NRB) for the channel bandwidth and SCS in NR FR1.

TABLE 8

| SCS (kHz) | 5 MHz NRB | 10 MHz NRB | 15 MHz NRB | 20 MHz NRB | 25 MHz NRB | 30 MHz NRB | 40 MHz NRB | 50 MHz NRB | 60 MHz NRB | 80 MHz NRB | 90 MHz NRB | 100 MHz NRB |
|---|---|---|---|---|---|---|---|---|---|---|---|---|
| 15 | 25 | 52 | 79 | 106 | 133 | 160 | 216 | 270 | N/A | N/A | N/A | N/A |
| 30 | 11 | 24 | 38 | 51 | 65 | 78 | 106 | 133 | 162 | 217 | 245 | 273 |
| 60 | N/A | 11 | 18 | 24 | 31 | 38 | 51 | 65 | 79 | 107 | 121 | 135 |

The contents described below are mainly eMTC-related features, but may be equally applied to MTC, eMTC, and MTC applied to 5G (or NR) unless particularly specified. Hereinafter, the MTC, eMTC, and MTC applied to 5G (or NR) will be collectively referred to as MTC for convenience of description.

Therefore, the MTC described below may be referred to as other terms such as enhanced MTC (eMTC), LTE-M1/M2, Bandwidth reduced low complexity/coverage enhanced (BL/CE), non-BL UE (in enhanced coverage), NR MTC, enhanced BL/CE, etc. That is, the terms called MTC may be replaced with a term to be defined in the 3GPP standard in the future.

The MTC operates only in a specific system bandwidth (or channel bandwidth).

The specific system bandwidth may use 6 RBs of the legacy LTE as shown in Table 6 below and defined by considering the frequency range and subcarrier spacing (SCS) of the NR shown in Tables 7 to 9. The specific system bandwidth may be referred to as narrowband (NB). Here, the legacy LTE may encompass what is described in the 3GPP standards except the MTC. In the NR, the MTC may use RBs corresponding the smallest system bandwidth in Tables 8 and 9 as in the legacy LTE. Alternatively, the MTC may operate in at least one bandwidth part (BWP) or in a specific band of a BWP.

TABLE 6

| | Channel bandwidth BWChannel [MHz] | | | | | |
|---|---|---|---|---|---|---|
| | 1.4 | 3 | 5 | 10 | 15 | 20 |
| Transmission bandwidth configuration $N_{RB}$ | 6 | 15 | 25 | 50 | 75 | 100 |

Table 9 shows an example of the maximum transmission bandwidth configuration (NRB) for the channel bandwidth and SCS in NR FR2.

TABLE 9

| SCS (kHz) | 50 MHz NRB | 100 MHz NRB | 200 MHz NRB | 400 MHz NRB |
|---|---|---|---|---|
| 60 | 66 | 132 | 264 | N.A |
| 120 | 32 | 66 | 132 | 264 |

D. NB-IoT (Narrowband-Internet of Things)

The NB-IoT may refer to a system for supporting low complexity and low power consumption through a system bandwidth (system BW) corresponding to 1 Physical Resource Block (PRB) of the wireless communication system (e.g., the LTE system or the NR system).

Here, the NB-IoT may be replaced with other terms such as NB-LTE, NB-IoT enhancement, enhanced NB-IoT, further enhanced NB-IoT, NB-NR, etc. That is, the NB-IoT may be replaced with a term defined or to be defined in the 3GPP standard, which will be hereinafter collectively expressed as 'NB-IoT'.

The NB-IoT may be primarily used as a communication mode for implementing the IoT (i.e., Internet of things) by supporting a device (or UE) such as machine-type communication (MTC) in a cellular system. Furthermore, the NB-IoT system uses the same OFDM parameters of the legacy system as the OFDM parameters such as subcarrier spacing (SCS) used in the legacy wireless communication system (e.g., the 3GPP system, the LTE system, and the NR system), and as a result, an additional band need not be allocated for the NB-IoT system. In this case, 1 PRB of the legacy system band is allocated for the NB-IoT, which is advantageous in using the frequency efficiently. In addition, in the case of the NB-IoT, since each UE recognizes a single PRB as each carrier, the PRB referred to herein may be interpreted as the same meaning as the carrier.

The contents (3GPP system, frame structure, MTC/NB-IoT system, initial access, random access, DRX, etc.) described in FIGS. 1 to 12 above may be applied in combination with methods proposed in the present disclosure to be described below or may be supplemented to clarify technical features of the methods proposed in the present disclosure.

General Procedure

A UIoT relay operation proposed by the present disclosure to be described below may be applied in combination with each of the above-described initial access (IA) procedure and random access (RA) procedure, or in combination with one or more.

First, a UE operation in which the UIoT relay operation proposed in the present disclosure is performed in relation to the initial access procedure and/or the random access procedure described above is as follows.

The UE may be configured with parameters (or control information) defined or configured to perform the methods proposed by the present disclosure from the BS through signaling (e.g., DCI, MAC CE, reference signal, synchronization signal, etc.) received through an initial access procedure (or a random access procedure included in the initial access procedure) (1) or configured with the defined or configured parameters through signaling (e.g., DCI, MAC CE, reference signal, synchronization signal, RRC signaling, etc.) received in an RRC connected state after the initial access procedure (or the random access procedure included in the initial access procedure) (2).

In addition, the UE may perform the methods proposed by the present disclosure after the initial access procedure (or the random access procedure included in the initial access procedure) based on the parameters received above.

Next, a BS operation will be described.

The BS may configure the parameters (or control information) defined or configured to perform the methods proposed by the present disclosure through the initial access procedure (e.g., the random access procedure included in the initial access procedure) and transmit the configured parameters to the UE through specific signaling (e.g., DCI, MAC CE, reference signal, synchronization signal, etc.) (1) or configure the parameters in the RRC connected state after the initial access procedure (e.g., the random access procedure included in the initial access procedure) and transmit the configured parameters to the UE through specific signaling (e.g., DCI, MAC CE, reference signal, synchronization signal, RRC signaling, etc.) (2).

In addition, the BS may perform the methods proposed by the present disclosure after the initial access procedure (or the random access procedure included in the initial access procedure) based on the corresponding parameters.

Second, a procedure in which the UIoT relay operation proposed by the present disclosure is performed in relation to a procedure of receiving the NPDCCH (or MPDCCH) during the on duration of the DRX cycle described above and transitioning to the RRC connected state will be described separately in terms of the UE and BS operations.

A procedure to be described below may be independently performed or performed in relation to the initial access procedure and/or random access procedure described above.

When the procedure to be described below is performed in relation to the initial access procedure and/or random access procedure described above, the UE or the BS may perform the initial access and/or random access in the process of performing cell (re)selection after transmitting/receiving the paging message in the DRX mode.

First, the UE operation will be described.

The UE may be configured with the parameters (or control information) defined or configured to perform the methods proposed by the present disclosure from the BS through signaling (e.g., DCI, MAC CE, reference signal, synchronization signal, RRC signaling, etc.) received in relation to the DRX operation (1), configured with the defined or configured parameters through the paging message (2), or configured with the defined or configured parameters through the RRC signaling in the RRC connected state (3).

In addition, the UE may receive the paging in the DRX based on the parameters received above and perform the methods proposed by the present disclosure in the RRC connected state.

Next, the BS operation will be described.

The BS may configure the parameters for performing the methods proposed by the present disclosure through a procedure related to DRX and transmit the configured parameters to the UE through specific signaling (e.g., DCI, MAC CE, reference signal, synchronization signal, RRC signaling, etc.) (1), transmit the parameters to the UE through the paging message (2), or transmit the parameters to the UE through the RRC signaling (3).

In addition, the BS may perform the methods proposed b the present disclosure after transmitting the paging in the DRX based on the corresponding parameters.

However, with the above-described contents as an example, the parameter configuration and the UE/BS operation for performing the methods proposed by the present disclosure may be performed in relation to the operations mentioned throughout the present disclosure.

Hereinafter, a UIoT relay will be described in detail.

In wireless cellular systems, low-complexity wireless communication devices such as NB-IoT, (e)MTC, or other IoT devices of the 3GPP LTE system are also installed in areas with severe attenuation of radio signals such as underground, or communication via a relay is required instead of direct communication with the base station in order to operate wide coverage with a small number of base stations.

In this case, a large number of low-complexity wireless communication devices (e.g., IoT devices) are unintentionally distributed at random locations, and installed and removed at random times for configuration of sensor networks, etc. It may be inefficient that such a network uses a relay having a type of complexity and performance similar to the base station.

Accordingly, the present disclosure proposes a scheme of configuring the relay with the IoT device or a low-complexity device equivalent thereto. For convenience, in the present disclosure, the device having a relay function is named as a UE-type IoT relay device, a UIoT relay device, a relay terminal, or a relay device. However, the names are only for classification and do not limit the scope of the present disclosure and the same and similar technical spirit is included in the scope of the present disclosure regardless of the name.

The UIoT relay device may mean 1) a device that performs only the relay function or a device itself having both the relay function and a terminal function. In the case of 2) above, the UIoT relay device may receive a relay service from the relay device or provide the relay service to another UE.

In the present disclosure, naming "relay" may mean a state in which the UIoT relay device is connected to provide the relay service to another UE or UIoT relay device unless otherwise limited. Furthermore, the naming "UE" may be a device that receives the relay service from a specific relay unless otherwise mentioned and the UIoT relay device may mean performing a function as the UE.

When configuring a multi-hop relay network (two or more relay devices), the relay device may perform a relay operation providing the relay service to another UE while the relay device itself receives the relay service from another relay device.

The relay service means transferring data received from an upper node (e.g., the base station or an upper relay device) to a lower node (e.g., the UE, a lower relay device, or an NR UE), and transferring data received from the lower node to the upper node.

The UIoT relay device may serve to transfer the data received from the upper node (e.g., the base station or the upper relay device) to a UE to which the UIoT relay device provides the service and transfer the data received from the UE to the upper node. In this case, in the present disclosure, the following terms are used for convenience.

Backhaul (BH) link: Link for signal transmission and reception between the relay device and the upper node Backhaul downlink (BH DL): Link of transmitting the signal from the upper node to the relay device Backhaul uplink (BH UL): Link of transmitting the signal from the relay device to the upper node Access (AC) link: Link for signal transmission and reception between the relay device and the UE Access downlink (AC DL): Link of transmitting the signal from the relay device to the UE Access uplink (AC UL): Link of transmitting the signal from the UE to the relay device In the above-described multi-hop network, the UIoT relay device as the UE may receive the relay service by accessing the upper relay device. In the present disclosure, when the relay device receives the relay service from the upper relay device, the upper relay device may be named as a parent relay device or a parent node. The lower relay device may be named as a child relay device or a child node.

The relay device in the present disclosure may be an IAB-node (relay node) in Integrated Access and backhaul (IAB) links. IAB supports wireless backhaul and relay links according to extension of massive MIMO, multi-beam system and/or available frequency bandwidth (e.g., mmWave spectrum). Terms related to the IAB may be defined as follows.

IAB-node: RAN node supporting wireless access links for UEs and wireless backhaul links for parent nodes and child nodes
  Parent node: A next hop neighbor node or parent node of IAB-node-Mobile Termination (MT) may be next generation Node B (gNB), or IAB-node or IAB-donor-DU.
  Child node: A next hop neighbor node or child node of IAB-node-Distributed Unit (DU) may also correspond to the UE or the IAB-node.
  Mobile terminal (MT): Virtual module which is in charge of an operation with the upper node (e.g., upper relay, gNB, or parent node) in the relay
  Distributed unit (DU): Virtual module which is in charge of an operation with the lower node (e.g., lower relay, UE, or child node) in the relay A backhaul link operation between the base station and the relay device proposed by the present disclosure may be applied even to the BH operation between the parent node and the child node, and the access link operation between the relay device and the UE may be applied even to an operation between UEs receiving the service from the child node and the child node. That is, the upper node of the relay device may be the base station or another relay device.

The 'relay' disclosed in the present disclosure may mean (1) relaying signals between devices or (2) a relay device itself that relays the signals. Therefore, it is apparent that 'relay' is expressed in the present disclosure may not be interpreted only as a meaning of relaying the signals, but may mean the relay device.

Hereinafter, matters related to the access link using the side link will be described.

In the 3GPP LTE/NR system, the side link (SL) is defined for direct signal transmission and reception between the UEs (D2D).

In the case of a system in which Frequency Division Duplex (FDD) communication is performed, a downlink (DL) carrier and an uplink (UL) carrier are distinguished between the base station and the UE. In this case, the side link (SL) is defined to be included in the uplink (UL) carrier. Side link communication between the UEs is achieved by partially borrowing some of time/frequency resources of the uplink (UL) carrier.

In the case of a system in which Time Division Duplex (TDD) communication is performed, a downlink time period and an uplink time period are distinguished for the same carrier between the base station and the UE. In this case, the side link (SL) is defined to be included in the uplink time period. The side link communication between the UEs is achieved by partially borrowing some of time/frequency resources of the uplink time period.

In the present disclosure, it is assumed that the access link of the UIoT relay operation is configured by using side link resources. In this case, the communication of the access link using the side link may be basically performed by using the following signals.

Synchronization channel (SCH): The SCH is a signal which the relay device transmits in downlink in order to match time/frequency synchronization between the relay device and the UE. The SCH may have the same or similar structure as PSS/SSS/SSB of LTE/NR, NPSS/NSSS of NB-IoT, PSSS/SSSS of D2D, etc.

Random access channel (RACH): The RACH is a signal which the UE transmits in uplink in order to match the time/frequency synchronization between the relay device and the UE. The RACH may have the same structure as the SCH or have the same or similar structure as the random access preamble of the LTE/NR/NB-IoT.

Scheduling assignment channel (SACH): The RACH is a signal for transmitting scheduling information (MCS, TBS, data transmission resource/timing HARQ related information, etc) for subsequent data. The relay device may transmit the SACH to the UE in order to transmit AC DL data and the relay device may transmit the SACH to the UE in order to transmit AC UL data. The UE may transmit the SACH to the relay in order to transmit the AC UL data. The RACH may have the same or similar structure as (E)PDCCH of the LTE/NR, MPDCCH of the MTC, NPDCCH of the NB-IoT, PSCCH of the D2D, etc.

Scheduled data channel (DCH): The DCH is a signal for transmitting data scheduled by scheduling assignment (SA). The RACH may have the same or similar structure as PDSCH/PUSCH of the LTE/NR, NPDSCH/NPUSCH of the NB-IoT, PSSCH of the D2D, etc.

Broadcast data channel (BCH): The BCH is a signal for the relay device to transmit data to all UEs or a plurality of UEs which belong thereto directly without SA. The BCH may mainly include basic system information which all UEs should know in order to receive the relay service. The BCH may have the same or similar structure as PBCH of the LTE/NR, NPBCH of the NB-IoT, SIB transmitted through the PDSCH without (M/N)PDCCH in the MTC and the NB-IoT, PSBCH of the D2D, etc.

Direct data channel (dDCH): The dDCH is a signal for the relay device to transmit data to the UE or for the UE to transmit data to the relay device without SA. The dDCH may have the same or similar structure as the PDSCH of the D2D.

HARQ feedback channel (HCH): The HCH is a signal for transmitting HARQ ACK/NACK feedback with respect to data which a relay device receives from the UE or data which the UE receives from the relay device.

In the present disclosure, it is assumed that the backhaul link communication between the base station and the relay device or between the relay device and the relay device is basically performed by signals similar to the above-described signal. In the present disclosure, when the signals transmitted in the backhaul link and the signals transmitted in the access link need to be particularly distinguished, the backhaul link signals are attached with a prefix 'BH-', which are called BH-SCH, BH-RACH, BH-SACH, BH-DCH, BH-BCH, and BH-dDCH and the access link signals is attached with a prefix 'AC-' which are called AC-SCH, AC-RACH, AC-SACH, AC-DCH, AC-BCH, and AC-dDCH.

If there is no other limitation, the operation proposed by the present disclosure may be applied to both the backhaul link signal and the access link signal.

Expressions such as a link, a channel, etc., newly defined in relation to the backhaul link and the access link as examples may be replaced with expressions such as the link, the channel, etc., described for the same purpose in a future standard, of course.

Hereinafter, the basic operation of the UIoT relay will be described in detail.

In the present disclosure, it is assumed that the UIoT relay performs the relay operation between the base station and the UE, the backhaul link is performed through the same link resource as communication between the base station and the general UE. That is, when the UIoT relay accesses an FDD base station, the UIoT relay performs BH DL and BH UL operations through the downlink carrier and the uplink carrier of the corresponding base station, respectively and when the UIoT relay accesses a TDD base station, the UIoT relay performs the BH DL and BH UL operations through the downlink time period and the uplink time period of the corresponding base station, respectively. At the same time, it is assumed that the access link with the UE operates through the side link (SL) as described above.

Meanwhile, when the UIoT relay performs the relay operation between the relay device and the relay device (multi-hop relaying), it is assumed that both the backhaul link and the access link operate through the side link SL. In the present disclosure, when the BH operation through the side link (SL) and the BH operation with the base station need to be distinguished, the BH operations are called SL-BH and base station BH, respectively. If not particularly mentioned, the BH operation proposed by the present disclosure may be applied to both the SL-BH and the base station BH.

FIG. 13 illustrates a relay network configuration to which the present disclosure is applied.

Referring to FIG. 13, UE 1 that operates by directly accessing the base station (eNB) performs data transmission and reception through narrowband uplink/downlink (NB DL/UL). On the contrary, UE 2 that serve both as the relay or to perform the relay function performs the data transmission and reception to and from the eNB through a narrowband backhaul link (NB-BH) and performs the data transmission and reception to and from UE 3 itself providing the relay service through the side link (SL). Meanwhile, UE 5 that provides the multi-hop relay service from the eNB to UE 6 performs backhaul link data transmission and reception to and from UE 4 through the SL-BH and provides the relay service to UE 6 through the SL.

Hereinafter, the IoT relay device will be described in detail.

It is assumed that the relay has the following capability in order to implement a low-complexity relay as described above. However, it is not necessary to apply the following assumptions for the implementation of the present disclosure, and exceptional cases for each capability may be considered depending on the contents of each disclosure.

1) Narrowband

A bandwidth which the relay device may use for the backhaul link or the access link is smaller than the bandwidth of the base station. For example, in the LTE system, the relay device may use 6 RB or 25 RB (1 RB=12 subcarriers=approximately 180 kHz) when following the eMTC operation, and a bandwidth of 1 RB when following the NB-IoT operation.

2) Full-Duplex

In the present disclosure, a full duplex relay device capable of performing both a reception operation and a transmission operation is assumed unless specifically specified as a half-duplex relay device.

3) Single Component Carrier

In the case of an FDD backhaul link, the relay device operates only in one downlink carrier and one uplink carrier. In the case of a TDD backhaul link, the relay device may operate only in one identical carrier with respect to the downlink and the uplink.

4) Single TX/RX Chain

When the backhaul link and the access link use different frequency bands (e.g., a downlink band of the backhaul link+an uplink band of the access link), the relay device may perform transmission or reception simultaneously in the backhaul link and the access link.

Methods to be described below are just distinguished for convenience and it is needless to say that some components of any one method may be substituted with some components of another method or may be applied in combination with each other.

Hereinafter, transmission timings of backhaul uplink (BH UL) and access downlink (AC DL) of the relay will be described in detail.

Hereinafter, the BH UL and AC DL transmission timings of the relay will be described in detail.

Since narrow band backhaul downlink/uplink (NB-BH DL/UL) transmission and side link access downlink (SL-AC DL) transmission are performed through the same link resource as described above, the relay may perform UL transmission and DL transmission through a single RF/analog circuit. Therefore, the narrow band backhaul downlink/uplink (NB-BH DL/UL) and the side link access downlink (SL-AC DL) in consecutive time resources (e.g., subframe, slot) operate without special RF/analog circuit switching, and depending on the design, it is possible to simultaneously perform the UL transmission and the DL transmission through different frequency resources in the same time resource. To this end, the DL transmission timing and the UL transmission timing may be adjusted in the following scheme.

Hereinafter, the transmission timings of the backhaul uplink (BH UL) and the access downlink (AC DL) of the relay will be described in detail.

First, a case of the narrow band backhaul uplink (NB-BH UL) and side link access downlink (SL-AC DL) will be described.

Since the narrow band backhaul uplink (NB-BH UL) transmission and the side link access downlink (SL-AC DL) transmission are performed through the same link resource as described above, the relay may perform the UL transmission and the DL transmission through a single RF/analog circuit. Therefore, the narrow band backhaul uplink (NB-BH UL) and the side link access downlink (SL-AC DL) in consecutive time resources (e.g., subframe, slot) operate without special RF/analog circuit switching, and depending on the design, it is possible to simultaneously perform the UL transmission and the DL transmission through different frequency resources in the same time resource. To this end, the DL transmission timing and the UL transmission timing may be adjusted in the following scheme. The following schemes are characteristically applicable even between the narrow band backhaul uplink (NB-BH UL) and the NB-AC DL when the narrow band backhaul downlink/uplink (NB-BH DL/UL) operates by time division in a TDD scheme in the same carrier and the narrow band access downlink/uplink (NB-AC DL/UL) also operates in the TDD scheme.

When operations for the narrow band backhaul uplink (NB-BH UL) transmission and the side link access downlink (SL-AC DL) transmission are described, the relay device may determine the transmission timing for the narrow band backhaul uplink (NB-BH UL) transmission and/or the side link access downlink (SL-AC DL) transmission through Methods 1-1 to 1-3 below, and simultaneously perform the narrow band backhaul uplink (NB-BH UL) transmission and the side link access downlink (SL-AC DL) transmission through different frequency resources in the same time resource based on the determined transmission timing.

(Method 1-1)

A method of adjusting the side link access downlink (SL-AC DL) transmission timing based on the narrow band backhaul uplink (NB-BH UL) transmission timing may be considered.

In this scheme, the relay matches a boundary (e.g., subframe/slot boundary) of a unit time of the side link access downlink (SL-AC DL) transmission with the boundary of the unit time of the narrow band backhaul uplink (NB-BH UL) transmission or adjusts the boundary to a timing to which a specific offset is added.

In this case, the narrow band backhaul uplink (NB-BH UL) transmission timing may be defined as a timing offset for the DL reception timing from the BS to which the corresponding relay belongs, and the corresponding timing offset may be controlled by the BS.

The embodiment may be utilized when the BS to which the corresponding relay belongs controls transmission timings of UL transmission signals of other nodes.

Specifically, the BS to which the corresponding relay belongs controls the transmission timing of each node so that the reception timings in the BS for UL transmission signals of other nodes are aligned. The BS of the corresponding relay may match the side link access downlink (SL-AC DL) transmission timing with the backhaul uplink (BH UL) transmission timing according to the control.

Therefore, according to Method 1-1 above, since the access downlink (AC DL) transmission timing of the relay is determined based on the backhaul uplink (BH UL), it is easy to control the UL transmission timing of each node which belongs to the BS.

FIG. 14 illustrates the transmission timing determined according to Method 1-1 above.

FIG. 14 is a diagram for describing determination of a transmission timing based on an NB-BH UL transmission timing according to an embodiment of the present disclosure.

Referring to FIG. 14, a backhaul uplink transmission (TX to eNB) timing of a relay (Relay TX) may be determined based on a backhaul downlink reception timing (Tx timing based on RX timing from eNB). An access downlink transmission (Tx to child UE) timing of the relay (Relay TX) may be determined based on the backhaul uplink transmission timing (TX timing based on TX timing to eNB).

(Method 1-2)

A method of adjusting the narrow band backhaul uplink (NB-BH UL) transmission timing based on the side link access downlink (SL-AC DL) transmission timing may be considered.

In this scheme, the relay matches a boundary (e.g., subframe/slot boundary) of a unit time of the narrow band backhaul uplink (NB-BH UL) transmission with the boundary of the unit time of the side link access downlink (SL-AC DL) transmission or adjusts the boundary to a timing to which a specific offset is added.

In this case, the side link access downlink (SL-AC DL) transmission timing may be adjusted in a predetermined scheme through signal transmission/reception between adjacent nodes using the side link existing in the network. This has the advantage of being able to apply a common transmission timing between SL links when the transmission timing of adjacent nodes using the SL in the network needs to be equally matched.

FIG. 15 illustrates the transmission timing determined according to Method 1-2 above.

FIG. 15 is a diagram for describing determination of a transmission timing based on an SL-AC DL transmission timing according to an embodiment of the present disclosure.

Referring to FIG. 15, the side link access downlink transmission (Tx to child UE) timing of the relay (Relay TX) may be determined through signal transmission and reception between adjacent nodes using the corresponding side link (TX timing based on Coordination within SL). A backhaul uplink transmission (Tx to eNB) timing of the relay (Relay TX) may be determined based on the side link access downlink transmission timing (TX timing based on TX timing to child UE).

(Method 1-3)

A method of adjusting the side link access downlink (SL-AC DL) transmission timing based on the narrow band backhaul downlink (NB-BH DL) reception timing may be considered.

In this scheme, the relay matches a boundary (e.g., subframe/slot boundary) of a unit time of the side link access downlink (SL-AC DL) transmission with the boundary of the unit time of the narrow band backhaul downlink (NB-BH DL) transmission (TA=0) or adjusts the boundary to a timing to which a specific offset is added.

The embodiment may be useful when a timing advance (TA) value for the narrow band backhaul uplink (NB-BH UL) transmission of the relay is not valid. Specifically, a case where when the relay does not yet acquire the timing advance (TA) for the narrow band backhaul uplink (NB-BH UL) transmission, the relay intends to reconfigure the timing advance (TA) value may be described as an example.

The timing determination according to the embodiment may be the same result as regarding the narrow band backhaul uplink (NB-BH UL) transmission timing advance (TA) value for the narrow band backhaul downlink (NB-BH DL) reception timing as 0 and applying Method 1-1 above.

FIG. 16 illustrates the transmission timing determined according to Method 1-3.

FIG. 16 is a diagram for describing determination of a transmission timing based on an NB-BH DL reception timing according to an embodiment of the present disclosure.

Referring to FIG. 16, the access downlink transmission (Tx to child UE) timing of the relay (Relay TX) may be determined based on a timing when a relay (Relay RX) receives the backhaul downlink (TX timing based on RX timing from eNB).

Hereinafter, the case of the side link backhaul uplink (SL-BH UL) and the side link access downlink (SL-AC DL) in relation to the transmission timing of the relay will be described.

Since the side link backhaul uplink (SL-BH UL) transmission and the side link access downlink (SL-AC DL) transmission are performed through the same link resource as described above, a similar gain may be obtained by applying the following scheme similarly to the case of the narrow band backhaul uplink (NB-BH UL) and the side link access downlink (SL-AC DL). The resulting operations for the side link backhaul uplink (SL-BH UL) transmission and the side link access downlink (SL-AC DL) transmission are as follows.

The relay device may determine the transmission timing for the side link backhaul uplink (SL-BH UL) transmission and/or the side link access downlink (SL-AC DL) transmission through Methods 2-1 and 2-2 below. The relay device may simultaneously perform the side link backhaul uplink (SL-BH UL) transmission and the side link access downlink (SL-AC DL) transmission through different frequency resources in the same time resource based on the determined transmission timing.

(Method 2-1)

A method of adjusting the side link access downlink (SL-AC DL) transmission timing based on the side link backhaul uplink (SL-BH UL) transmission timing may be considered.

In this scheme, the relay matches a boundary (e.g., subframe/slot boundary) of a unit time of the side link access downlink (SL-AC DL) transmission with the boundary of the unit time of the side link backhaul uplink (SL-BH UL) transmission or adjusts the boundary to a timing to which a specific offset is added.

In this case, the side link backhaul uplink (SL-BH UL) transmission timing may be defined as a timing offset for the DL reception timing from a parent node to which the corresponding relay belongs, and the corresponding timing offset may be controlled by the parent node. Alternatively, the side link backhaul uplink (SL-BH UL) transmission timing may be adjusted in a predetermined scheme through signal transmission/reception between adjacent nodes using the side link existing in the network.

(Method 2-2) Adjusting side link backhaul uplink (SL-BH UL) transmission timing based on side link access downlink (SL-AC DL) transmission timing In this scheme, the relay matches a boundary (e.g., subframe/slot boundary) of a unit time of the side link backhaul uplink (SL-BH UL) transmission with the boundary of the unit time of the side link access downlink (SL-AC DL) transmission or adjusts the boundary to a timing to which a specific offset is added. In this case, the side link access downlink (SL-AC DL) transmission timing may be adjusted in a predetermined scheme through signal transmission/reception between adjacent nodes using the SL existing in the network.

Hereinafter, the case of the side link backhaul downlink (SL-BH DL) and the side link access uplink (SL-AC UL) in relation to the reception timing of the relay will be described.

Since side link backhaul downlink (SL-BH DL) reception and side link access uplink (SL-AC UL) reception are performed through the same SL resource, the relay may perform DL reception and UL reception through a single RF/analog circuit. Therefore, the narrow band backhaul uplink (NB-BH UL) and the side link access downlink (SL-AC DL) in consecutive time resources (e.g., subframe, slot) operate without special RF/analog circuit switching, and depending on the design, it is possible to simultaneously perform the DL reception and the UL reception through different frequency resources in the same time resource.

To this end, the DL reception timing and the UL reception timing may be adjusted in the following scheme. The following schemes are characteristically applicable even between the narrow band backhaul downlink (NB-BH DL) and the narrow band access uplink (NB-AC UL) when the narrow band backhaul downlink/uplink (NB-BH DL/UL) operates by time division in a time division duplex (TDD) scheme in the same carrier and the narrow band access downlink/uplink (NB-AC DL/UL) also operates in the TDD scheme.

(Method 3)

A method of adjusting a difference between the side link backhaul downlink (SL-BH DL) reception timing and the side link access uplink (SL-AC UL) reception timing within a specific value may be considered.

In this scheme, the relay adjusts a difference between a boundary (e.g., subframe/slot boundary) of a unit time of the side link backhaul downlink (SL-BH DL) reception and the boundary of the unit time of the side link access uplink (SL-AC UL) reception within a specific value (e.g., cyclic prefix length) or a value acquired by adding a specific offset value (e.g., an integer multiple of a symbol length) to the corresponding specific value.

To this end, the relay may deliver an adjustment value of a DL transmission timing to the parent relay through SACH, DCH, dDCH, or other separate control channels so as to adjust the side link backhaul downlink (SL-BH DL) transmission timing of the parent relay according to a desired reception timing.

Furthermore, the relay may deliver an adjustment value of a UL transmission timing to the child relay/UE through SACH, DCH, dDCH, or other separate control channels so as to adjust the side link access uplink (SL-AC UL) transmission timing of the child relay/UE according to a desired reception timing.

Hereinafter, simultaneous transmission through the backhaul uplink (BH UL) and the access downlink (AC DL) of the relay will be described in detail.

Since the backhaul uplink (NB-BH UL or SL-BH UL) transmission and the side link access downlink (SL-AC DL) transmission are performed through the same link resource as described above, the relay may perform UL transmission and DL transmission through a single RF/analog circuit. In this case, it may be advantageous in efficient operation of the frequency resource that the same time resource is allocated to the backhaul uplink (BH UL) and the access downlink (AC DL), and the transmission for the backhaul uplink (BH UL) and the transmission for the AL DL are simultaneously performed separately for the frequency (e.g., RB of LTE or NR). FIG. 17 illustrates such an operation.

FIG. 17 is a diagram for describing simultaneous transmission through BH UL and AC DL according to an embodiment of the present disclosure.

Referring to FIG. 17, different frequency resources (BH UL TX and AC DL TX) are allocated to the backhaul uplink and the access downlink of the UIoT relay in the same carrier (SL UL Carrier BW).

Each frequency resource (BH UL TX or AC DL TX) may be equally allocated to the backhaul link and the access link. However, the present disclosure is not limited thereto, and each frequency resource (BH UL TX or AC DL TX) may be allocated to the backhaul link and the access link at different ratios by considering the operation efficiency of the frequency resource.

The UIoT relay may simultaneously perform transmission of backhaul uplink and access downlink in the same time domain using a corresponding frequency resource.

Hereinafter, the simultaneous transmission will be described in detail in Methods 4-1 to 4-3.

(Method 4-1)

The same time resource is allocated to (NB- or SL-) backhaul uplink (BH UL) and side link access downlink (SL-AC DL) operated in the same carrier. The relay may simultaneously perform signal transmission for backhaul uplink (BH UL) and side link access downlink (SL-AC DL) in a corresponding time resource using different frequencies.

In this case, the backhaul uplink (BH UL) resource and the side link access downlink (SL-AC DL) resource allocated to the same time resource within the corresponding carrier may be allocated to different frequency resources within the same narrow band or allocated in different narrow bands.

The relay may be required to adjust the transmission power in order to perform simultaneous transmission for backhaul uplink (BH UL) and side link access downlink (SL-AC DL) in the same time resource.

According to an embodiment, the relay may adjust the transmission power when the sum of power required for signal transmission through each link exceeds a specific power value. However, the present disclosure is not limited thereto, and the relay may adjust the transmission power even in other cases so that signal transmission through each link is smoothly performed. As an example, the relay may adjust the transmission power even when the difference between the transmission powers required for signal transmission through each link exceeds a specific value, and thus interference between two signals occurs significantly. Matters related thereto will be described below.

The specific power value may be a value set or calculated according to a network or other protocol, or a maximum transmission power value of the relay.

According to an embodiment, in order to adjust the transmission power, the relay may abandon transmission of one of a signal to be transmitted through the backhaul uplink (BH UL) or a signal to be transmitted through the side link access downlink (SL-AC DL) or adjust the transmission power to a value smaller than the original target value.

Hereinafter, the adjustment of the transmission power will be described in detail in Methods 4-2 and 4-3.

(Method 4-2)

A method in which the relay adjusts the transmission power by applying a predetermined priority when the sum of powers required for signal transmission through each link exceeds the specific power value may be considered.

Specifically, when the relay performs the simultaneous transmission for the backhaul uplink (BH UL) and the side link access downlink (SL-AC DL) in the same time resource, if the sum of powers required for signal transmission through each link exceeds the specific power value, the predetermined priority is applied. According to the result of applying the priority, the relay first abandons a signal of a lower priority or lowers a transmission power value of the corresponding signal to adjust the transmission power. The following options 1) and 2) show examples of the predetermined priorities.

Option 1) Signal transmitted through BH UL>signal transmitted through SL-AC DL

Option 2) BCH/SCH transmitted through SL-AC DL>HCH/RACH transmitted through BH UL>SACH/DCH/dDCH transmitted through SL-AC DL or BH UL In addition, when the relay performs the simultaneous transmission for the backhaul uplink (BH UL) and the side link access downlink (SL-AC DL) in the same time resource, if the difference in power required for signal transmission through each link is too high, it may be sufficient that a Digital to Analog Converter (DAC) resolution of a relay transmitter circuit outputs two signals with sufficient precision or interference due to in-band emission between the two signals may be significant. In order to solve this problem, Method 4-3 below may be applied.

(Method 4-3)

A method may be considered, in which the relay adjusts the power when the difference between the powers required for signal transmission through each link exceeds a specific value.

Specifically, when the relay performs the simultaneous transmission for the backhaul uplink (BH UL) and the side link access downlink (SL-AC DL) in the same time resource, if the difference between the powers required for signal transmission through each link exceeds the specific value, the relay may adjust the power. The relay abandons transmission of one signal of two signals or adjusts the transmission power of the corresponding signal to adjust a power difference within the specific value. In this case, the relay may apply the predetermined priority. The following options 1) and 2) show examples of the predetermined priorities.

Option 1) Signal transmitted through BH UL>signal transmitted through SL-AC DL

Option 2) BCH/SCH transmitted through SL-AC DL>HCH/RACH transmitted through BH UL>SACH/DCH/dDCH transmitted through SL-AC DL or BH UL The following matters related to the transmission timing of the relay may be considered.

Even when the backhaul uplink (BH UL) transmission timing and the side link access downlink (SL-AC DL) transmission timing are independently operated, if the simultaneous transmission is performed in the same time resource, the method related to the above-described timing determination may be applied. Specifically, when the relay performs the simultaneous transmission in the same time resource for the backhaul uplink (BH UL) and the side link access downlink (SL-AC DL), the backhaul uplink (BH UL) transmission timing and the side link access downlink (SL-AC DL) transmission timing may be matched by applying the scheme such as Method 1-3 above for convenience of FFT/IFFT and signal generation of the relay.

When the difference between the backhaul uplink (BH UL) transmission timing and the side link access downlink (SL-AC DL) transmission timing independently operated exceeds a specific threshold, the relay may abandon transmission of any one transmission of the backhaul uplink (BH UL) signal and the side link access downlink (SL-AC DL) signal to be simultaneously transmitted. In this case, the predetermined priority may be applied in relation to abandoning of the transmission.

Hereinafter, simultaneous reception through the backhaul downlink (BH DL) and the access uplink (AC UL) of the relay will be described.

The UIoT relay configures the side link backhaul downlink (SL-BH DL) and the side link access uplink (SL-AC UL) through the same carrier operating the side link. The UIoT relay may perform the side link backhaul downlink (SL-BH DL) reception and the side link access uplink (SL-AC UL) reception through a single RF/analog circuit.

In this case, it may be advantageous in efficient operation of the frequency resource that the same time resource is allocated to the side link backhaul downlink (SL-BH DL) and the side link access uplink (SL-AC UL), and the reception for the side link backhaul downlink (SL-BH DL) and the reception for the side link access uplink (SL-AC UL) are simultaneously performed separately for the frequency (e.g., RB of LTE or NR). In this regard, the following method may be considered.

(Method 5)

A method may be considered in which the relay simultaneously receives the backhaul link signal and the access link signal in the same time resource.

Specifically, the same time resource and the same narrow band may be allocated to the side link backhaul downlink (SL-BH DL) and the side link access uplink (SL-AC UL) operated in the same carrier. The relay may simultaneously perform signal transmission for the side link backhaul downlink (SL-BH DL) and side link access uplink (SL-AC UL) in the corresponding time resource and narrow band by using different frequencies.

When the methods described in the present disclosure are applied to MTC (as which MTC, eMTC, 5G MTC, etc., are collectively referred), the narrow band may be 6 RBs (1.08 MHz) and when the methods are applied to NB-IoT, the narrow band may be 1 RB (180 KHz). In addition, a narrow band hopping or multiple narrow band operation to be described below may be, of course, used together with the narrow band hopping or multiple narrow band method applied to the MTC or NB-IoT.

Hereinafter, the narrow band hopping will be described in detail.

When the relay performs the narrow band backhaul uplink (NB-BH UL) operation for communication with the corresponding BS in a carrier which the BS operates as an uplink (UL) carrier, the following matters may be considered.

Specifically, when the BS operates an enhanced Machine-Type Communication (eMTC) narrow band in the corresponding carrier and applies the narrow band hopping, the same hopping may be applied even to a narrow band which the relay uses for the narrow band backhaul uplink (NB-BH UL). Such an operation may be advantageous for coexistence with UEs which operate in direct connection with the BS.

Even though the BS does not operate the eMTC narrow band hopping, when it is considered that an interference amount or radio channel characteristics may vary depending on the frequency location of the UL carrier, hopping the narrow band used for the narrow band backhaul uplink (NB-BH UL) may be advantageous in terms of frequency diversity. Therefore, an operation of Method 6-1 below may be considered.

(Method 6-1)

A method may be considered in which the narrow band which the relay uses for the narrow band backhaul uplink (NB-BH UL) is configured to be hopped to different frequency locations according to the time. In this case, an accurate narrow band hopping pattern may be the same as a narrow band hopping pattern which the BS applies to eMTC UEs which directly access the UL carrier.

Furthermore, similarly even when the relay performs the side link backhaul downlink/uplink (SL-BH DL/UL) operation for communication with the parent node in the carrier which the BS operates as the UL carrier or when the relay performs the side link access downlink/uplink (SL-AC DL/UL) operation for communication with the child relay or the UE, applying the narrow band hopping may be advantageous in terms of coexistence with the eMTC narrow band which the BS operates in the corresponding UL carrier or the frequency diversity. Therefore, an operation of Method 6-2 below may be considered.

(Method 6-2)

The narrow band which the relay uses for the side link backhaul downlink/uplink (SL-BH DL/UL) or the side link access downlink/uplink (SL-AC DL/UL) may be configured to be hopped to different frequency locations according to the time. In this case, an accurate narrow band hopping pattern may be the same as a narrow band hopping pattern which the BS applies to eMTC UEs which directly access the UL carrier.

When the narrow band hopping is applied to the backhaul downlink (BH DL) as in the above schemes, if there is no narrow band hopping pattern and no absolute timing when the relay or the UE performs an operation of detecting an SCH transmitted by a random relay or then reading a BCH in the corresponding downlink (DL) carrier, it may be difficult to perform the corresponding operation. Alternatively, even if the narrow band hopping pattern or absolute timing of each relay is known, it may be inefficient to detect the SCH/BCH while performing the narrow band hopping. Therefore, an operation according to Method 6-3 below may be considered.

(Method 6-3)

When the narrow band hopping is applied to the side link backhaul downlink (SL-BH DL) transmission, a narrow band for transmitting the SCH or BCH may be fixed to a narrow band at a specific frequency location irrespective of the narrow band hopping.

FIG. 18 illustrates the narrow band hopping according to Method 6-3 above.

FIG. 18 is a diagram for describing an operation related to narrow band hopping according to an embodiment of the present disclosure.

Referring to FIG. 18, a narrow band allocated to the side link backhaul downlink (SL-BH DL) within the same carrier (SL UL carrier BW) is hopped to a different frequency location according to a time (subframe). However, a specific narrow band having a fixed frequency location may be allocated to the side link backhaul downlink (SL-BH DL SCH/BCH) for reception of the SCH and/or BCH.

Hereinafter, a multiple narrow band operation will be described in detail.

In the present disclosure, it is assumed that the UIoT relay generally performs a transmission/reception operation through the NB-BH and the SL-BH through only one narrow band at one time. However, even though the increased complexity and cost of implementing the relay are considered, it may be considered to simultaneously perform backhaul transmission/reception through a plurality of narrow bands.

Through the above operation, the relay service may be stably provided to a plurality of child nodes or UEs. The reason is that a backhaul link throughput (BH throughput) obtained according to a backhaul link transmission/reception operation through the plurality of narrow bands may support the amount of traffic required for providing the relay service to the plurality of child relays or UEs.

A relay capable of performing the backhaul link reception through the plurality of narrow bands at the same time may obtain time/frequency synchronization or system information required for receiving another narrow band by using only the SCH/BCH transmitted through one narrow band among the plurality of corresponding narrow bands. Therefore, it may be efficient for resource operation to transmit the SCH or BCH only in one narrow band among a plurality of narrow bands in which the relay performs a simultaneous reception operation. In addition, from the viewpoint of backhaul uplink (BH UL) transmission, it may be efficient to perform a similar operation using the plurality of narrow bands.

Hereinafter, the contents will be described in detail in Methods 7-1 and 7-2.

(Method 7-1)

The relay simultaneously receives signals through the plurality of narrow bands in the side link backhaul downlink (SL-BH DL) or the narrow band backhaul downlink (NB-BH DL). In this case, the SCH or BCH may be received through only a specific narrow band among the plurality of corresponding narrow bands. The specific narrow band may be a narrow band to which the frequency hopping is applied or fixed at a specific frequency location according to the time.

(Method 7-2)

The relay simultaneously transmits signals through the plurality of narrow bands in the side link backhaul uplink (SL-BH UL) or the narrow band backhaul uplink (NB-BH UL). In this case, the SCH or RACH may be received through only a specific narrow band among the plurality of corresponding narrow bands. The specific narrow band may be a narrow band to which the frequency hopping is applied or fixed at a specific frequency location according to the time.

Similarly in the backhaul link, the relay simultaneously transmits or receives the signals through the plurality of narrow bands even in the side link access downlink (SL-AC DL) or the side link access uplink (SL-AC UL) to provide the relay service to different child relays/UEs through each narrow band or provide the relay service to the child relay/UE capable of simultaneously transmitting and receiving the signals through the plurality of narrow bands. Hereinafter, the contents will be described in detail in Methods 7-3 and 7-4.

(Method 7-3)

The relay may simultaneously transmit the signals through the plurality of narrow bands in the side link access downlink (SL-AC DL).

The signal transmitted through each narrow band may be a signal for a different UE or a signal for one child relay/UE capable of receiving the signals through the plurality of narrow bands.

The SCH or BCH may be transmitted through only a specific narrow band among the plurality of corresponding narrow bands or through each narrow band. Here, an operation of transmitting the SCH/BCH through only the specific narrow band may be limited to a case where signal transmission through the plurality of corresponding narrow bands is allocated to one child relay/UE. The specific narrow band may be a narrow band to which the frequency hopping is applied or fixed at a specific frequency location according to the time.

(Method 7-4)

The relay may simultaneously receive the signals through the plurality of narrow bands in the side link access uplink (SL-AC UL).

The signal received through each narrow band may be a signal from a different UE or a signal from one child relay/UE capable of transmitting the signals through the plurality of narrow bands. In this case, the HCH or RACH may be received through only a specific narrow band among the plurality of corresponding narrow bands or through each narrow band. A specific narrow band capable of performing the corresponding RACH or HCH transmission may be separately configured to the UEs through system information (e.g., configured through the system information) or designated to the same as or paired with the narrow band for transmitting the SCH/BCH. In addition, the narrow band for transmitting the RACH and the narrow band for transmitting the HCH may be designated as the same narrow band.

An operation of receiving the HCH/RACH through only the specific narrow band may be limited to a case where signal reception through the plurality of corresponding narrow bands is allocated to one child relay/UE. The specific narrow band may be a narrow band to which the frequency hopping is applied or fixed at a specific frequency location according to the time.

FIG. 19 illustrates the operation of the relay according to the above-described method.

FIG. 19 is a diagram for describing an operation related to a plurality of narrow bands according to an embodiment of the present disclosure.

Referring to FIG. 19, a plurality of different narrow bands are allocated to the side link backhaul downlink (SL-BH DL) and the side link access uplink (SL-AC UL) within the same carrier (SL UL carrier BW). In order to efficiently operate the frequency resource, a specific signal may be received through one narrow band.

Specifically, the SCH/BCH received from the upper node (parent node) through the backhaul link and the RACH/HCH received from at least one lower node (child node) through the access link may be received from each specific narrow band (SL-BH SCH/BCH or SL-AC UL RACH/HCH) among the plurality of narrow bands allocated to each link.

In FIG. 19, a case where the specific narrow band has a fixed frequency location, and the specific narrow band for receiving the SCH/BCH and the specific narrow band for receiving the RACH/HCH are configured to be identical is assumed and illustrated.

In terms of implementation, the operations of the upper node/relay device/lower node according to the above-described embodiment (e.g., signaling and operations related to at least any one of Methods 1 to 7) may be processed by devices (e.g., processors 102 and 202 in FIG. 23) in FIGS. 22 to 26 to be described below.

Further, the operations of the upper node/relay device/lower node according to the above-described embodiment (e.g., signaling and operations related to at least any one of Methods 1 to 7) may be stored in a memory (e.g., one or more memories 104 and 204 in FIG. 23) in the form of a command/program (e.g., instruction or executable code) for driving at least one processor (e.g., 104 or 204 in FIG. 23).

The embodiments according to Methods 1 to 7 described below are just distinguished for convenience and it is needless to say that some components of any one method may be substituted with some components of another method or may be applied in combination with each other.

Hereinafter, in FIGS. 20 and 21, the above-described embodiments will be described in detail focusing on the operation of the relay terminal.

FIG. 20 is a flowchart for describing a method for a relay terminal to transmit and receive according to an embodiment of the present disclosure.

Referring to FIG. 20, the method for the relay terminal to transmit and receive signals according to an embodiment of the present disclosure may include transmitting, in a first time region, a UL signal to an upper node through a backhaul link and a DL signal to at least one lower node through an access link in a first time region (S2010) and receiving, in a second time region, a DL signal from the upper node through the backhaul link and a UL signal from the at least one lower node through the access link (S2020).

Steps S2010 and S2020 need not particularly be included together as a configuration of the method for the relay terminal to transmit and receive signals and only any one step may be included.

According to an embodiment, the method for the relay terminal to transmit and receive signals may include step S2010 above. In this case, the reception operation of the relay terminal may follow the legacy operation scheme.

According to an embodiment, the method for the relay terminal to transmit and receive signals may include step S2020 above. In this case, the transmission operation of the relay terminal may follow the legacy operation scheme.

In step S2010, the relay terminal simultaneously transmits the signals through the backhaul link and the access link in the first time region. Specifically, the relay terminal may transmit, in the first time region, the UL signal to the upper node through the backhaul link and the DL signal to the at least one lower node through the access link.

In the first time region, the UL signal is a backhaul uplink (BH UL) signal and the DL signal is an access downlink (AC DL) signal.

The upper node may be the BS or another relay terminal. Specifically, in the case of a multi-hop relay network, the upper node may be another relay terminal.

The lower node may be a UE that receives the relay service from the relay terminal.

The first time region may be a time resource (e.g., subframe, slot) allocated for transmission of a backhaul uplink (BH UL) signal and transmission of an access downlink (AC DL) signal.

In terms of implementation, according to S2010 described above, the operation of the relay terminal (e.g., 100/200 in FIG. 23) which transmits the UL signal to the upper node (e.g., 100/200 in FIG. 23) through the backhaul link and the DL signal to the at least one lower node (e.g., 100/200 in FIG. 23) through the access link in the first time region may be implemented by the devices in FIGS. 22 to 26.

For example, referring to FIG. 23, one or more processors 102 may control one or more transceivers 106 and/or one or more memories 104 so as to transmit and receive the UL signal to the upper node (e.g., 100/200 in FIG. 23) through the backhaul link and the DL signal to the at least one lower node (e.g., 100/200 in FIG. 23) through the access link in the first time region.

In step S2020, the relay terminal simultaneously receives the signals through the backhaul link and the access link in the second time region. Specifically, the relay terminal may transmit, in the first time region, the DL signal to the upper node through the backhaul link and the UL signal to the at least one lower node through the access link.

In the second time region, the DL signal is a backhaul downlink (BH DL) signal and the UL signal is an access uplink (AC UL) signal.

The second time region may be a time resource (e.g., subframe, slot) allocated for reception of the backhaul downlink (BH DL) signal and reception of the access uplink (AC UL) signal.

According to an embodiment, different frequency resources may be allocated to the UL signal and the DL signal within the same carrier in each of the first time region and the second time region.

The frequency resource may be equally allocated to the backhaul link signals (BH UL and BH DL) and the access link signals (AC DL and AC UL). However, the present disclosure is not limited thereto, and the frequency resources may be allocated at different ratios to the backhaul link signal and the access link signal by considering efficiency of frequency resource operation.

According to an embodiment, the backhaul link and the access link may be side links (SLs).

Matters related to the effect of simultaneous transmission/reception of the relay terminal within the same carrier will be described below in detail.

For example, it is assumed that the relay terminal and the lower node (e.g., UE) in an FDD cellular network perform a transmission/reception operation in a side link (SL) format in an uplink carrier (UL carrier).

The relay terminal may perform transmission and reception by using the corresponding FDD resource in the backhaul link with the upper node. In this case, when the relay terminal performs backhaul uplink (BH UL) transmission to the upper node, if access downlink (AC DL) transmission to the lower node is designed not to be performed, the UL carrier should be temporally divided between the backhaul link and the access link. That is, since the frequency resources should be divided and used according to the time, the resource operation becomes inefficient. Therefore, when simultaneous transmission is permitted, the resources may be more efficiently operated.

As a case where such an effect is more prominent, a multi-hop relay scenario in an FDD cellular network may be exemplified. Here, it is assumed that the backhaul link is transmitted and received in the side link format in the uplink carrier (UL carrier) and the access link is also transmitted and received in the side link format in the uplink carrier (UL carrier).

In the legacy relay scenarios, the backhaul downlink (BH DL) is limited to a downlink carrier (DL carrier in the case of FDD) or a downlink subframe (in the case of TDD), and the access uplink (AC UL) is limited to an uplink carrier (UL carrier) or an uplink subframe (UL subframe). Therefore, according to the legacy relay scenarios, there is no room for the simultaneous reception operation through the backhaul link and the access link in the relay terminal.

However, when the backhaul link and the access link are the side links in the FDD multi-hop relay scenario, both the backhaul downlink (BH DL) and the access uplink (AC UL) are belong to the same UL carrier. When different frequency resources are allocated to the backhaul downlink (BH DL) and the access uplink (AC UL) within the corresponding carrier, it becomes possible for the relay terminal to perform the simultaneous reception operation from the upper node and the lower node. Therefore, uplink carrier resources may be used more efficiently.

According to an embodiment, the frequency resource may include at least one narrow band and the at least one narrow band may be frequency-hopped according to a specific hopping pattern.

When the upper node operates an enhanced machine-type communication (eMTC) narrow band and applies narrow band hopping, the specific hopping pattern may be the same as the corresponding hopping pattern. Specifically, the specific hopping pattern may be the same as a narrow band hopping pattern applied to enhanced machine-type communication (eMTC) UEs which directly access the UL carrier by the upper node.

In this case, a narrow band fixed to a specific frequency location may be allocated to a Synchronization Channel (SCH) or a Broadcast data Channel (BCH) among the DL signals received through the backhaul link.

According to an embodiment, the frequency resource may include a plurality of narrow bands, and a specific signal among the signals transmitted or received through the backhaul link or the access link may be transmitted or received through a specific narrow band among the plurality of narrow bands.

When the relay terminal transmits and receives the signals through the plurality of narrow bands as described above, a throughput increases, thereby more stably providing the relay service. In this case, a specific signal which may be transmitted or received by the relay terminal through one narrow band may be configured to be transmitted or received through the specific narrow band in terms of efficiency of frequency resource operation.

According to an embodiment, the specific signal may be at least one of the synchronization channel (SCH), the broadcast data channel (BCH), a random access channel (RACH), or an HARQ feedback channel (HCH).

According to an embodiment, the specific narrow band among the plurality of narrow bands may be frequency-hopped according to a specific hopping pattern. The specific narrow band may not be frequency-hopped, but may be fixed to a specific frequency location.

In terms of implementation, according to S2020 described above, the operation of the relay terminal (e.g., 100/200 in FIG. 23) which receives the DL signal from the upper node (e.g., 100/200 in FIG. 23) through the backhaul link and the UL signal from the at least one lower node (e.g., 100/200 in FIG. 23) through the access link in the second time region may be implemented by the devices in FIGS. 22 to 26.

For example, referring to FIG. 23, one or more processors 102 may control one or more transceivers 106 and/or one or more memories 104 so as to receive the DL signal from the upper node (e.g., 100/200 in FIG. 23) through the backhaul link and the UL signal from the at least one lower node (e.g., 100/200 in FIG. 23) through the access link in the second time region.

Hereinafter, an operation related to transmission power adjustment of the relay terminal will be described in detail with reference to FIG. 21.

FIG. 21 is a flowchart for describing an operation related to transmission power adjustment in a method for a relay terminal to transmit and receive signals according to an embodiment of the present disclosure.

Referring to FIG. 21, the step of transmitting the signal (S2010) according to an embodiment of the present disclosure may further include a transmission power calculating step (S2110) and a transmission power adjusting step (S2120).

In step S2110, the relay terminal calculates transmission power required for UL signal transmission through the backhaul link and transmission power required for DL signal transmission through the access link.

In terms of implementation, according to S2110 described above, an operation of the relay terminal (e.g., 100/200 in FIG. 23) which calculates the transmission power required for the UL signal transmission through the backhaul link and the transmission power required for the DL signal transmission through the access link may be implemented by the devices in FIGS. 22 to 26.

For example, referring to FIG. 23, one or more processors 102 may calculate the transmission power required for the UL signal transmission through the backhaul link and the transmission power required for the DL signal transmission through the access link.

In step S2120, the relay terminal adjusts any one transmission power of the calculated transmission powers when a predetermined condition is satisfied.

According to an embodiment, the predetermined condition may be satisfied when the sum of the calculated transmission powers exceeds the maximum transmission power of the relay terminal or a difference between the calculated transmission powers exceeds a specific value.

The adjustment scheme of the transmission power may vary depending on the satisfied condition.

As a specific example, the adjustment of the transmission power may be performed so as for the relay terminal to lower at least one transmission power of the transmission power of the UL signal transmitted through the backhaul link or the transmission power of the DL signal transmitted through the access link so that the sum of the transmission powers is equal to or less than the maximum transmission power of the relay terminal.

As another example, the adjustment of the transmission power may be performed so as for the relay terminal to raise or lower at least one transmission power of the transmission power of the UL signal transmitted through the backhaul link or the transmission power of the DL signal transmitted through the access link so that the difference between the calculated transmission powers is equal to or less than the specific value.

According to an embodiment, the relay terminal may abandon transmission of a signal having a low priority or adjust the transmission power of the corresponding signal.

Specifically, the relay terminal may determine a signal having a lower priority of the UL signal transmitted through the backhaul link and the DL signal transmitted through the access link is determined according to a predetermined priority. The relay terminal may abandon transmission of the signal having the low priority or adjust the transmission power of the corresponding signal.

According to an embodiment, of the UL signal transmitted through the backhaul link and the DL signal transmitted through the access link, the relay terminal may determine, as the signal having the low priority, 1) a signal corresponding to any one of a scheduling assignment channel (SACH), a scheduled data channel (DCH), or a direct data channel (dDCH), 2) the DL signal transmitted through the access link, and the signal corresponding to 1) or 2) above. As an example, the relay terminal may determine the signal corresponding to 2) above as the signal having the low priority when there is no signal corresponding to 1) above.

In terms of implementation, according to S2120 described above, an operation of the relay terminal which adjusts any one transmission power of the calculated transmission powers when the predetermined condition is satisfied may be implemented by the devices in FIGS. 22 to 26.

For example, referring to FIG. 23, one or more processors 102 may adjust any one transmission power of the calculated transmission powers when the predetermined condition is satisfied. One or more processors 102 may control one or more transceivers 106 and/or one or more memories 104 so as to transmit the signal according to the adjusted transmission power.

Example of Wireless Communication System Applied to the Present Disclosure

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

FIG. 22 illustrates a communication system 1 applied to the present disclosure.

Referring to FIG. 22, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Example of Wireless Device Applied to the Present Disclosure.

FIG. 23 illustrates wireless devices applicable to the present disclosure.

Referring to FIG. 23, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 22.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Example of Signal Processing Circuit Applied to the Present Disclosure

FIG. 24 illustrates a signal process circuit for a transmission signal.

Referring to FIG. 24, a signal processing circuit 1000 may include scramblers 1010, modulators 1020, a layer mapper 1030, a precoder 1040, resource mappers 1050, and signal generators 1060. An operation/function of FIG. 24 may be performed, without being limited to, the processors 102 and 202 and/or the transceivers 106 and 206 of FIG. 23. Hardware elements of FIG. 24 may be implemented by the processors 102 and 202 and/or the transceivers 106 and 206 of FIG. 23. For example, blocks 1010 to 1060 may be implemented by the processors 102 and 202 of FIG. 23. Alternatively, the blocks 1010 to 1050 may be implemented by the processors 102 and 202 of FIG. 23 and the block 1060 may be implemented by the transceivers 106 and 206 of FIG. 23.

Codewords may be converted into radio signals via the signal processing circuit 1000 of FIG. 24. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 24. For example, the wireless devices (e.g., 100 and 200 of FIG. 23) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Example of Application of Wireless Device Applied to the Present Disclosure

FIG. 25 illustrates another example of a wireless device applied to the present disclosure.

The wireless device may be implemented in various forms according to a use-case/service (refer to FIG. 22). Referring to FIG. 25, wireless devices 100 and 200 may correspond to the wireless devices 100 and 200 of FIG. 23 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 23. For example, the transceiver(s) 114 may include the one or more transceivers 106 and 206 and/or the one or more antennas 108 and 208 of FIG. 23. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 22), the vehicles (100b-1 and 100b-2 of FIG. 22), the XR device (100c of FIG. 22), the hand-held device (100d of FIG. 22), the home appliance (100e of FIG. 22), the IoT device (100f of FIG. 22), a digital broadcast terminal, a hologram device, a public safety device, an MTC device, a medicine device, a fintech device (or a finance device), a security device, a climate/environment device, the AI server/ device (400 of FIG. 22), the BSs (200 of FIG. 22), a network node, etc. The wireless device may be used in a mobile or fixed place according to a use-example/service.

In FIG. 25, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Example of Hand-Held Device Applied to the Present Disclosure

FIG. 26 illustrates a hand-held device applied to the present disclosure.

The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 26, a hand-held device 100 may include an antenna unit 108, a communication unit 110, a control unit 120, a memory unit 130, a power supply unit 140*a*, an interface unit 140*b*, and an I/O unit 140*c*. The antenna unit 108 may be configured as a part of the communication unit 110. Blocks 110 to 130/140*a* to 140*c* correspond to the blocks 110 to 130/140 of FIG. 25, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140*a* may supply power to the hand-held device 100 and include a wired/wireless charging circuit, a battery, etc. The interface unit 140*b* may support connection of the hand-held device 100 to other external devices. The interface unit 140*b* may include various ports (e.g., an audio I/O port and a video I/O port) for connection with external devices. The I/O unit 140*c* may input or output video information/signal s, audio information/signal s, data, and/or information input by a user. The I/O unit 140*c* may include a camera, a microphone, a user input unit, a display unit 140*d*, a speaker, and/or a haptic module.

As an example, in the case of data communication, the I/O unit 140*c* may acquire information/signals (e.g., touch, text, voice, images, or video) input by a user and the acquired information/signals may be stored in the memory unit 130. The communication unit 110 may convert the information/ signals stored in the memory into radio signals and transmit the converted radio signals to other wireless devices directly or to a BS. The communication unit 110 may receive radio signals from other wireless devices or the BS and then restore the received radio signals into original information/ signals. The restored information/signals may be stored in the memory unit 130 and may be output as various types (e.g., text, voice, images, video, or haptic) through the I/O unit 140*c*.

The effects according to an embodiment of the present disclosure will be described below.

In a method for a relay terminal to transmit and receive signals in a wireless communication system and a device for the same according to an embodiment of the present disclosure, signals can be simultaneously transmitted and received through a backhaul link and an access link to which different frequency resources in the same carrier are allocated. Accordingly, according to the present disclosure, the frequency resource can be efficiently operated in providing a relay service.

In addition, according to an embodiment of the present disclosure, the relay terminal calculates a transmission power required for UL signal transmission through the backhaul link and the transmission power required for DL signal transmission through the access link, and adjusts any one transmission power according to whether a predetermined condition is satisfied. Therefore, according to the present disclosure, in performing simultaneous transmission of the backhaul link and the access link, a case where a maximum transmission power of the relay terminal is exceeded or a problem in which a difference between the calculated transmission powers exceeds a specific value, resulting in large interference between respective signals can be prevented.

Furthermore, according to an embodiment of the present disclosure, the relay terminal abandons transmission of a signal having a low priority or adjusts the transmission power of the corresponding signal in adjusting the transmission power. Accordingly, according to the present disclosure, it is possible to minimize degradation of a relay service quality due to execution of simultaneous transmission through the backhaul link and the access link.

Furthermore, according to an embodiment of the present disclosure, different frequency resources allocated to the backhaul link and the access link include at least one narrow band and are frequency-hopped according to a specific hopping pattern. Therefore, according to the present disclosure, in providing a relay service, an interference amount depending on a frequency location or an influence due to a radio channel characteristic can be reduced.

Furthermore, according to the present disclosure, frequency hopping is applied to a narrow band allocated to each signal in order to obtain frequency diversity, but in the case of a Synchronization Channel (SCH) or a Broadcast data Channel (BCH), a narrow band fixed to a specific frequency location is allocated so that the relay terminal easily detects the corresponding signal. Therefore, according to the present disclosure, operating efficiency of the relay terminal according to frequency hopping can be improved.

Furthermore, according to an embodiment of the present disclosure, different frequency resources allocated to the signals transmitted and received through the backhaul link and the access link include a plurality of narrow bands. Accordingly, according to the present disclosure, the relay service can be stably provided to a plurality of sub-nodes by utilizing an increased throughput.

Furthermore, according to an embodiment of the present disclosure, among the signals transmitted or received through the backhaul link or the access link, a specific signal is transmitted or received through a specific narrow band among the plurality of narrow bands. Accordingly, according to the present disclosure, a specific signal that can be transmitted or received through one narrow band is transmitted and received through a specific narrow band to more efficiently operate resources.

The embodiments of the present disclosure described hereinbelow are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present disclosure or included as a new claim by subsequent amendment after the application is filed.

The embodiments of the present disclosure may be achieved by various means, for example, hardware, firmware, software, or a combination thereof. In a hardware configuration, the methods according to the embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present disclosure may be implemented in the form of a module, a procedure, a function, etc. For example, software code may be stored in a memory unit and executed by a processor. The memories may be located at the interior or exterior of the processors and may transmit data to and receive data from the processors via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

The invention claimed is:

1. A method for a relay terminal to transmit and receive signals in a wireless communication system, the method comprising:
    transmitting, in a first time region, a UL signal to an upper node through a backhaul link and a DL signal to at least one lower node through an access link; and
    receiving, in a second time region, a DL signal from the upper node through the backhaul link and a UL signal from the at least one lower node through the access link,
    wherein different frequency resources are allocated to the UL signal and the DL signal in the same carrier in each of the first time region and the second time region, and
    wherein the backhaul link and the access link are side links (SLs).

2. The method of claim 1, comprising:
    calculating transmission power required for UL signal transmission through the backhaul link and transmission power required for DL signal transmission through the access link; and
    adjusting any one transmission power among the calculated transmission powers based on a predetermined condition is-being satisfied.

3. The method of claim 2, wherein the predetermined condition is satisfied based on a sum of the calculated transmission powers exceeding a maximum transmission power of the relay terminal or a difference between the calculated transmission powers exceeds a specific value.

4. The method of claim 3, wherein in the adjusting of the transmission power,
    a signal having a lower priority of the UL signal transmitted through the backhaul link and the DL signal transmitted through the access link is determined according to a predetermined priority, and
    transmission of the signal having the lower priority is abandoned or a transmission power of the corresponding signal is adjusted.

5. The method of claim 4, wherein in the adjusting of the transmission power,
    of the UL signal transmitted through the backhaul link and the DL signal transmitted through the access link,
    1) a signal corresponding to any one of a scheduling assignment channel (SACH), a scheduled data channel (DCH), or a direct data channel (dDCH),
    2) the DL signal transmitted through the access link, and
    the signal corresponding to 1) or 2) above is determined as the signal having the lower priority.

6. The method of claim 1, wherein the frequency resource includes at least one narrow band, and
    the at least one narrow band is frequency-hopped according to a specific hopping pattern.

7. The method of claim 6, wherein a narrow band fixed to a specific frequency location is allocated to a Synchronization Channel (SCH) or a Broadcast data Channel (BCH) among the DL signals received through the backhaul link.

8. The method of claim 1, wherein the frequency resource includes a plurality of narrow bands, and
    a specific signal among the signals transmitted or received through the backhaul link or the access link is transmitted or received through a specific narrow band among the plurality of narrow bands.

9. The method of claim 8, wherein the specific signal is at least one of the synchronization channel (SCH), the broadcast data channel (BCH), a random access channel (RACH), or an HARQ feedback channel (HCH).

10. The method of claim 9, wherein the specific narrow band is frequency-hopped according to a specific hopping pattern.

11. A relay terminal transmitting and receiving signals in a wireless communication system, the relay terminal comprising:
    a transceiver transmitting and receiving a radio signal;
    a memory; and
    a processor connected to the transceiver and the memory,
    wherein the processor is configured to
    transmit, in a first time region, a UL signal to an upper node through a backhaul link and a DL signal to at least one lower node through an access link, and receive, in a second time region, a DL signal from the upper node through the backhaul link and a UL signal from the at least one lower node through the access link, wherein the different frequency resources are allocated to the UL signal and the DL signal in the same carrier in each of the first time region and the second time region, and wherein the backhaul link and the access link are side links (SLs).

12. The relay terminal of claim 11, wherein the processor is configured to calculate transmission power required for UL signal transmission through the backhaul link and transmission power required for DL signal transmission through the access link, and adjust any one transmission power among the calculated transmission powers based on a predetermined condition being satisfied.

13. The relay terminal of claim 12, wherein the predetermined condition is satisfied based on a sum of the calculated transmission powers exceeding a maximum transmission power of the relay terminal or a difference between the calculated transmission powers exceeds a specific value.

* * * * *